US012753283B2

(12) United States Patent
Stücker et al.

(10) Patent No.: US 12,753,283 B2
(45) Date of Patent: Oct. 6, 2026

(54) METHOD FOR PRODUCING STABILIZED LIGNIN HAVING A HIGH SPECIFIC SURFACE AREA

(71) Applicant: Suncoal Industries GmbH, Ludwigsfelde (DE)

(72) Inventors: Alexander Stücker, Wacken (DE); Jacob Podschun, Berlin (DE); Tobias Wittmann, Berlin (DE); Lenz Aron Mathis Köhl, Berlin (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 721 days.

(21) Appl. No.: 18/004,744

(22) PCT Filed: Jul. 12, 2021

(86) PCT No.: PCT/EP2021/069378

§ 371 (c)(1),
(2) Date: Jan. 9, 2023

(87) PCT Pub. No.: WO2022/008762

PCT Pub. Date: Jan. 13, 2022

(65) Prior Publication Data

US 2023/0287185 A1 Sep. 14, 2023

(30) Foreign Application Priority Data

Jul. 10, 2020 (DE) ..................... 10 2020 208 684.2
Dec. 23, 2020 (DE) ..................... 10 2020 134 900.9

(51) Int. Cl.
*C08H 7/00* (2011.01)
*C08J 3/14* (2006.01)

(Continued)

(52) U.S. Cl.
CPC .................. *C08H 6/00* (2013.01); *C08J 3/14* (2013.01); *C08L 21/00* (2013.01); *C08L 97/005* (2013.01); *C08J 2397/00* (2013.01)

(58) Field of Classification Search
CPC ........... C08H 6/00; C08J 3/14; C08J 2397/00; C08L 21/00; C08L 97/005

(Continued)

(56) References Cited

U.S. PATENT DOCUMENTS

2015/0166836 A1* 6/2015 Liu .................... C09D 197/005 524/76

FOREIGN PATENT DOCUMENTS

CN 103254452 A 8/2013
CN 106966390 A * 7/2017

(Continued)

OTHER PUBLICATIONS

Li et al., CN 103254452 A machine translation in English, Aug. 21, 2013. (Year: 2013).*

(Continued)

*Primary Examiner* — David T Karst
(74) *Attorney, Agent, or Firm* — Servilla Whitney LLC

(57) ABSTRACT

The present invention relates to a method for producing lignin in particle form from a liquid containing lignin-containing raw material, the method comprising at least: reacting the liquid with a cross-linking agent (step a)), precipitating the lignin, thereby forming lignin particles in the liquid (step b)), and separating the liquid from the lignin particles formed in step b) (step c)), and wherein, in step b), the liquid is heat-treated, after precipitation, at a temperature in the range of 60 to 200° C. for a period of 1 minute to 6 hours, and/or, in an additional step d) after step c), the lignin particles separated from the liquid are heat-treated at a temperature in the range of 60 to 600° C. The invention also (Continued)

relates to lignin particles which can be obtained according to the method, lignin particles per se, a use of the lignin particles as filler, and a rubber composition comprising, inter alia, a filler component, the latter containing lignin particles as a filler.

13 Claims, 13 Drawing Sheets

(51) Int. Cl.
*C08L 21/00* (2006.01)
*C08L 97/00* (2006.01)

(58) Field of Classification Search
USPC .......................................................... 530/507
See application file for complete search history.

(56) References Cited

FOREIGN PATENT DOCUMENTS

| | | | | |
|---|---|---|---|---|
| CN | 108892786 A | * 1/2018 | ................ | C08J 3/03 |
| DE | 102014215807 B3 | 12/2015 | | |
| WO | 2012005677 A1 | 1/2012 | | |
| WO | 2015018944 A1 | 2/2015 | | |
| WO | 2017085278 A1 | 5/2017 | | |

OTHER PUBLICATIONS

Lin et al., CN 106966390 A machine translation in English, Jul. 21, 2017. (Year: 2017).*
Pang et al., CN 108892786 A Machine Translation in English, Nov. 27, 2018. (Year: 2018).*
Translation of PCT International Search Report in PCT/EP2021/069378 dated Nov. 18, 2021, 3 pages.
Osterberg, Monika , et al., "Spherical lignin particles: a review on their sustainability and applications", Green Chemistry, GB, vol. 22, No. 9, May 11, 2020 (May 11, 2020), pp. 2712-2733.
Zou, Tao , et al., "Solvent-Resistant Lignin-Epoxy Hybrid Nanoparticles for Covalent Surface Modification and High-Strength Particulate Adhesives", ACS NANO, US, vol. 15, No. 3, Mar. 23, 2021 (Mar. 23, 2021), pp. 4811-4823.

* cited by examiner

METHOD FOR PRODUCING STABILIZED LIGNIN HAVING A HIGH SPECIFIC SURFACE AREA

CROSS-REFERENCE TO RELATED APPLICATIONS

This application is the National Stage entry of PCT/EP2021/069378, filed on Jul. 12, 2021, which claims priority to Germany Appln. Ser. No. 102020208684.2, filed on Jul. 10, 2020 and Germany Appln. Ser. No. 102020134900.9, filed on Dec. 23, 2020, which are incorporated herein by reference in their entireties.

The present invention relates to a method for producing a lignin in particulate form from a liquid that contains lignin-containing raw-material, wherein the method comprises at least a reaction with a cross-linking agent (step a)), a precipitation of the lignin with formation of lignin particles in the liquid (step b)) and a separation of the liquid of the lignin particles formed in step b) (step c)), and wherein, within step b), the liquid is after precipitation heat-treated at a temperature in the range from 60 to 200° C. for a duration of 1 minute to 6 hours, and/or, in an additional step d) after step c), the lignin particles separated from the liquid are heat-treated at a temperature in the range from 60 to 600° C.

STATE OF THE ART/BACKGROUND OF THE INVENTION

Lignin from hardwood, softwood and annual plants exhibits high solubility in many polar and alkaline media after extraction/recovery in the form of, for example, kraft lignin, lignosulfonate or hydrolysis lignin. Lignins exhibit inter alia a glass transition at temperatures of mostly 80° C. to 150° C. The microscopic structure of lignin particles is changed by softening already at low temperatures. Therefore, lignin-containing materials normally are not stable, but change their properties at high temperatures. Moreover, the solubility of lignin in polar solvents such as dioxane and acetone containing, e.g., 10% water or in an alkaline medium is usually >95% (Sameni et al., BioResources, 2017, 12, 1548-1565; Podschun et al., European Polymer Journal, 2015, 67, 1-11). In US 2013/0116383 A1, a production of cross-linked lignin is disclosed, and it is envisaged to increase the solubility of such lignin in polar solvents, such as aqueous alkaline solutions. Due to these and other properties, lignin can be used only to a limited extent in material applications (DE102013002574A1). Hereinafter, lignin is to be understood as the sum of Klason lignin and acid-soluble lignin. The dry mass can in addition contain other organic and inorganic constituents.

In order to overcome these disadvantages, it has been proposed to produce a stabilized lignin by hydrothermal carbonization or hydrothermal treatment that is characterized by a softening temperature (glass transition temperature) of more than 200° C. (WO2015018944A1). By adjusting the pH value in such methods, it is possible to obtain a stabilized lignin with a defined particle size distribution (WO2015018944A1).

Improved methods use lignin as a raw material for the production of particulate carbon materials that can find application for example as functional fillers in elastomers (WO2017085278A1). An essential quality parameter for functional fillers is the external surface area of the particulate carbon material, which is determined through measurement of the STSA. Such methods make use of hydrothermal carbonization of a lignin-containing liquid, usually at temperatures between 150° C. and 250° C. Because of the high reactivity of the lignin at such temperatures, it is necessary to achieve a fine tuning of pH value, ionic strength and lignin content of the lignin-containing liquid as well as the temperature and duration of the hydrothermal carbonization, in order to achieve high specific surface areas. This is achieved by adjusting the pH value to within the alkaline range, usually to values above 7.

For such particulate carbon materials, this opens the possibility for applications in materials that differ from those of the respective starting lignins. Because of the low solubility in alkaline medium of less than 40% and a specific surface area of more than 5 $m^2/g$ and less than 200 $m^2/g$, they can thus be used as reinforcing fillers in elastomers and completely or partially substitute carbon blacks.

The disadvantage of these known methods is the low yield, which is generally between 40% and 60%. A further disadvantage of these methods is the high effort for adapting the properties of the lignin-containing liquid (pH value, ionic strength, lignin content) to the process parameters of the hydrothermal carbonization (temperature and residence time) in order to achieve higher specific surface areas. While it is relatively easy to achieve surface areas in the range from 5 $m^2/g$ to 40 $m^2/g$, surface areas above 40 $m^2/g$ are more easily achieved in the laboratory than on an industrial scale, due to the required sensitivity of the abovementioned tuning. It can be assumed that such adjustment with the aim to increase the specific surface area will lead to a reduction in yield.

Disadvantageous in the methods for example known from WO2015018944A1 and WO2017085278A1 is, apart from the relatively high temperatures per se that are required for the hydrothermal treatment—a fact, that is disadvantageous already for economic reasons-, in particular the relatively high proportion of compounds soluble in polar or alkaline media in the product obtained after the hydrothermal treatment, compounds which form due to depolymerization reactions taking place at the relatively high temperatures selected. However, in particular when the hydrothermally treated lignins obtained are used as functional fillers in elastomers, the highest possible insolubility in the abovementioned media is desirable or necessary. Another disadvantage of the methods known for example from WO2015018944A1 and WO2017085278A1 is that the hydrothermally treated lignins obtainable from them have a relatively high content of organic compounds that can be outgassed therefrom (emissions), so that these have to be heated to temperatures of 150° C. to 250° C. in a separate process step after their production in order to meet specifications regarding emissions and/or to ensure odor neutrality.

Another known method for increasing the yield of solids and augmenting lignin conversion for the production of fuels from a suspension of dried black liquor and water by hydrothermal carbonization at temperatures between 220° C. and 280° C. is the addition of formaldehyde [Bioressource Technologie 2012, 110715-718, Kang et al.]. Kang et al. suggest to add 37 g of formaldehyde per 100 g of dry lignin at a solid matter concentration of 20% (100 ml of a 2.8% formaldehyde solution per 25 g dry mass obtained by drying black liquor with a lignin content of 30% based on dry mass). This enables the conversion of lignin contained in the black liquor to solids to be increased from 60%-80% to values between 90% and 100%, with the highest values being achieved at temperatures between 220° C. and 250° C. This prior art attributes the increase in yield to the polymerization between formaldehyde, the solid in the black liquor, and the carbonization products formed from this solid (page 716, final paragraph).

Disadvantages of this prior art:

- the high specific dosing of formaldehyde of 37 g per 100 g of lignin dry mass,
- the high ash content of the dry mass used as well as of the products produced therefrom,
- the high process temperatures and the high process pressures associated therewith,
- the polymerization between formaldehyde, the solid substance of the black liquor as well as the carbonization products formed from this solid substance,
- the high solubility of the products obtained,
- the high proportion of odor-intensive or volatile constituents, and
- the associated restriction of the use of the product to fuel applications (cf. Kang et al.).

Thus, there is the need for new methods for producing stabilized lignins in particulate form and for products obtainable by means of these methods, as well as for materials produced by using these products, all of which do not exhibit the above-mentioned disadvantages of the known methods and products.

Short Description of the Invention, Object and Solution

The aim of the present invention is to find a method that leads to a stabilized lignin suitable for material applications while achieving high yields.

The object of the invention is in particular to provide a method which

- reduces the solubility of the lignin in alkaline and/or polar media,
- increases or eliminates the glass transition temperature of the lignin,
- results in a stabilized lignin having advantageous particle properties,
- results in stabilized products having, if any, only a low content of organic compounds that can be outgassed therefrom (emissions),
- has a high yield and/or
- requires only relatively low temperatures, in particular for the treatment of liquid media, so that a simplified and economically advantageous process sequence compared to the methods of the state of the art is made possible.

This object is achieved by the subject matters claimed in the patent claims as well as the preferred embodiments of these subject matters as described in the following specification. Particularly surprisingly, the object could be solved by a method in which, inter alia, a precipitating agent is employed in order to precipitate dissolved lignin from the solution with formation of lignin particles.

In a first subject matter, the invention relates to a method for producing a lignin in particulate form from a liquid containing lignin-containing raw-material, wherein the lignin is at least in part dissolved in the liquid, wherein the method comprises the following steps:

a) reacting lignin dissolved in the liquid with at least one cross-linking agent in the liquid at a temperature in the range from 50 to 180° C. in order to obtain modified lignin dissolved in the liquid, b) precipitating the dissolved modified lignin obtained in step a) by mixing the liquid with a precipitating agent at a temperature in the range from 0 to below 150° C. with the formation of lignin particles in the liquid, and c) separating the liquid from the lignin particles formed in step b), wherein in step b) the liquid mixed with the precipitating agent is heat-treated after the precipitation at a temperature in the range from 60 to 200° C., preferably from 80 to 150° C., particularly preferably from 80 to below 150° C., for a period of 1 minute to 6 hours, and/or in an additional step d) after step c), the lignin particles separated from the liquid are heat-treated at a temperature in the range from 60 to 600° C., or a method for producing a lignin in particulate form from a liquid containing lignin-containing raw-material, wherein the lignin is at least in part dissolved in the liquid, wherein the method comprises the following steps:

a) reacting lignin dissolved in the liquid with at least one cross-linking agent in the liquid at a temperature in the range from 50 to 180° C. in order to obtain modified lignin dissolved in the liquid, b) precipitating the dissolved modified lignin obtained in step a) by mixing the liquid with a precipitating agent at a temperature in the range from 0 to below 150° C. with the formation of lignin particles in the liquid, and c) separating the liquid from the lignin particles formed in step b), wherein in step b) the liquid mixed with the precipitating agent is heat-treated at a temperature in the range from 80 to 150° C., and/or in an additional step d) after step c), the lignin particles separated from the liquid are heat-treated at a temperature in the range from 60 to 600° C.

In another subject matter, the invention further relates to lignin particles that are obtainable by the method according to the invention, wherein the lignin particles

- have a d50 value of the particle size distribution, relative to the volume average, of less than 500 μm, preferably less than 50 μm, more preferably of less than 20 μm, and/or
- have an STSA surface area in the range from 2 $m^2/g$ to 180 $m^2/g$, preferably 10 $m^2/g$ to 180 $m^2/g$, preferably from 20 $m^2/g$ to 180 $m^2/g$, further preferably from 35 $m^2/g$ to 150 or 180 $m^2/g$, particularly preferably from 40 $m^2/g$ to 120 or 180 $m^2/g$.

In another subject matter, the invention further relates to lignin particles, wherein the lignin particles

- have a d50 value of the particle size distribution, relative to the volume average, of less than 500 μm, preferably less than 50 μm, more preferably of less than 20 μm, and/or
- have an STSA surface area in the range from 2 $m^2/g$ to 180 $m^2/g$, preferably 10 $m^2/g$ to 180 $m^2/g$, preferably from 20 $m^2/g$ to 180 $m^2/g$, further preferably from 35 $m^2/g$ to 150 or 180 $m^2/g$, particularly preferably from 40 $m^2/g$ to 120 or 180 $m^2/g$, wherein the particles have a proportion of compounds soluble in an alkaline medium of less than 30%, preferably of less than 25%, particularly preferably of less than 20%, moreover preferably of less than 15%, moreover particularly preferably of less than 10%, further preferably of less than 7.5%, in particular of less than 5%, most preferably of less than 2.5% or of less than 1%, with respect to the total weight of the particles, respectively, wherein the alkaline medium represents an aqueous solution of NaOH (0.1 mol/l or 0.2 mol/l), and the proportion is determined according to the method described in the description. and the particles have a proportion of organic compounds that can be outgassed therefrom (emissions), as determined by thermal desorption analysis according to VDA 278 (May 2016), that lies at <200 μg/g, particularly preferably at <175 μg/g of lignin particles, more particularly preferably at <150 μg/g of lignin particles, more preferably at <100 μg/g of lignin particles, more preferably at <50 μg/g of lignin particles, in particular at <25 μg/g of lignin particles.

By the method according to the invention, stabilized lignin particles with a high specific surface area, e.g., stabilized lignin with an STSA surface area of at least 2 $m^2/g$, preferably 10 $m^2/g$, can be provided from lignin-containing raw materials. For the formation of these particles, only relatively low temperatures in liquid media are required. This enables a simplified and economically advantageous process management.

In addition, the products obtainable according to the invention are distinguished by having only a very low proportion of compounds soluble in polar or alkaline media, if any at all, which is preferably ≤30%, particularly preferably ≤20%, more particularly preferably ≤10%, further preferably less than 7.5%, in particular less than 5%, most preferably less than 2.5% or less than 1%, relative to their total weight, respectively, if the products are employed as functional fillers in elastomers. In this context, it was found that in particular the selected process sequence can prevent or at least largely prevent the occurrence of undesirable depolymerization reactions, which is the cause of the comparatively low proportion of compounds soluble in polar or alkaline media. In this context, it has in particular been found that for the alternative of the method according to the invention, according to which the lignin particles separated from the liquid are heat-treated at a temperature in the range from 60 to 600° C. in an additional step d) after performing step c), the selected temperature range of the heat treatment is relevant for the comparatively low proportion of compounds soluble in polar or alkaline media in the product produced according to the invention. It has been shown in the experimental part of this document, that a heat treatment at a lower temperature such as 40° C. (Example "PS2 Water Separation 5"), as was also been chosen, e.g., in Example 1 of US 2013/0116383 A1 as the drying temperature, results in a significantly higher and, according to the invention, undesired solubility in polar or alkaline media. This is in line with the general teaching of US 2013/0116383 A1 that aims for improved solubility, but in contrast to the aim envisaged by the present invention.

Further, the products according to the invention are distinguished by having, if any at all, only a low content of organic compounds that can be outgassed therefrom (emissions), as determined by thermal desorption analysis according to VDA 278 (May 2016). Thus, they meet with industrial specifications in particular with regard to emissions and/or odor neutrality, without requiring another separate process step for lowering the content of organic compounds that can be outgassed therefrom. Preferably, the lignin particles have a proportion of organic compounds that can be outgassed therefrom (emissions), as determined by thermal desorption analysis according to VDA 278 (May 2016), that lies at <200 μg/g, particularly preferably at <175 μg/g of lignin particles, more particularly preferably at <150 μg/g of lignin particles, moreover preferably at <100 μg/g of lignin particles, particularly preferably at <50 μg/g of lignin particles, in some instances at <25 μg/g of lignin particles.

Further, it has been found particularly surprisingly that the selected treatment duration of the heat treatment in step b) from 1 minute to 6 h achieves and enables the aforementioned low desired solubility in particular in alkaline media ("alkaline solubility"). Similarly, it was surprisingly found that the selected treatment duration of the heat treatment in step b) from 1 minute to 6 h achieves and enables the aforementioned only low desired emission levels. The heat treatment thus goes beyond mere coagulation of the particles. It has been found in particular that these advantageous effects can be achieved if the duration of the heat treatment after precipitation in step b) is at least 5 or at least 10 minutes, preferably at least 15 or at least 20 minutes, particularly preferably at least 25 minutes or at least 30 minutes, or the duration of the heat treatment after precipitation in step b) is in a range from 5 minutes to 5 hours, preferably from 10 minutes to 4.5 hours, particularly preferably from 15 minutes to 4 hours, more particularly preferably from 20 minutes to 3.5 hours, in particular from 25 or 30 minutes to 3 hours. In particular, the desired alkaline solubility and/or the desired emission values cannot be achieved if the duration of the heat treatment in step b) is too short. In addition, it has been found that with too long a duration of the heat treatment in step b) the particle size of the lignin particles, determined as d50 value of the particle size distribution, relative to the volume average, will be too high, which can than, for example with regard to the employment of the particles as fillers, have disadvantages, and that the STSA surface area of the particles will become too low with too long a duration of the treatment.

Another subject matter of the present invention is a use of the lignin particles as filler, in particular in rubber compositions.

Another subject matter of the present invention is a rubber composition comprising at least one rubber component and at least one filler component, wherein the filler component contains lignin particles according to the invention as the filler, wherein the rubber composition preferably is vulcanizable.

DETAILED DESCRIPTION OF THE INVENTION

In the context of the present invention, the lignin in particulate form produced by means of the method according to the invention will be referred to as stabilized lignin. To stabilize the lignin particles, the liquid mixed with the precipitating agent in step b) is after precipitation heat-treated in step b) at a temperature in the range from 60 to 200° C., preferably from 80 to 150° C., particularly preferably from 80 to below 150° C., preferably for a duration of 1 minute to 6 hours, and/or in an additional step d) after step c), the lignin particles separated from the liquid are heat-treated at a temperature in the range from 60 to 600° C.

Preferred Lignin-Containing Raw Materials

In the method according to the invention, a liquid that contains lignin-containing raw material is employed as the starting material, wherein lignin is at least in part dissolved in the liquid.

Preferred lignin-containing raw materials are in particular:

- black liquor from kraft pulping of woody biomass or solids produced therefrom (e.g., LignoBoost lignin, LignoForce lignin),
- solids from enzymatic hydrolysis of woody biomass, black liquor from pulping of woody biomass with sulfites (lignosulfonates) or solids produced therefrom, or liquids from pulping of woody biomass with organic solvents such as, e.g., ethanol, or organic acids, or solids produced therefrom (e.g., Organosolv lignin).

The solids produced from the above-mentioned lignin-containing liquids such as black liquor are by their very nature lignin-containing solids. They can, e.g., be obtained by separating off the liquid constituents from the lignin-containing liquid, e.g., by evaporating, wherein optionally other treatment steps may be carried out, e.g., a purification. Such lignin-containing solids are commercially available.

If the lignin-containing raw material is a liquid, it can be used per se as the liquid containing the lignin-containing raw material, wherein at least a part of the lignin is dissolved in the liquid. Of course, other liquids or additives can be included as needed.

If the lignin-containing raw materials are solids, they will be mixed with a liquid so that the liquid contained therein will be completely or partially dissolved in the liquid in a dissolving stage before the step a) (the first process stage) in order to provide a liquid suitable for the method according to the invention that contains the lignin-containing raw material, that contains lignin dissolved in a liquid.

Advantageously, in the dissolving stage the lignin-containing raw material is mixed with a liquid and at least partially dissolved in this liquid. The liquid may comprise several substances, and additives may be added to the liquid that increase the solubility of the lignin-containing raw material or are otherwise useful. The liquid may contain water and/or organic solvents.

In a preferred embodiment, the dissolution of the lignin-containing raw material is carried out in an alkaline liquid. A preferred liquid comprises water, i.e., an aqueous alkaline liquid. Preferred liquids comprise sodium hydroxide, milk of lime and/or caustic potash solution.

In an alternative preferred embodiment, the dissolution of the lignin-containing raw material is carried out in an acidic liquid, e.g., an aqueous acidic liquid. A preferred liquid comprises water and at least one carboxylic acid, for example formic acid, citric acid and/or acetic acid. In a preferred embodiment, the liquid may contain a carboxylic acid, e.g., formic acid and/or acetic acid, in high amounts, e.g., more than 50% by weight or more than 80% by weight, of the liquid, wherein it may be a technical grade carboxylic acid that does not contain more than 10% by weight of water.

The liquid may further comprise alcohols, for example ethanol.

It is particularly preferred that the liquid comprises or is selected from an acidic aqueous liquid or an alkaline aqueous liquid, preferably sodium hydroxide, at least one carboxylic acid, preferably formic acid and/or acetic acid, or at least one alcohol, preferably ethanol.

In addition to the dissolved lignin which is reacted with the cross-linking agent in the first process stage (step a)), undissolved lignin can also be present dispersed in the liquid. Thus, it is not necessary for the present method that the whole lignin is present in the liquid in dissolved form. In some variants, more than 0.5%, more than 1%, more than 2.5%, more than 5% or more than 10% of the dry matter of the lignin-containing raw material are undissolved. In some variants, more than 0.5%, more than 1%, more than 2.5%, more than 5% or more than 10% of the lignin of the lignin-containing raw material are undissolved.

It has been found that the following properties of the liquid introduced in step a) (the first process stage), which contains the lignin-containing raw material, are particularly suitable for successful process management:

Advantageously, more than 50%, preferably more than 60%, particularly preferably more than 70%, moreover preferably more than 80%, in particular more than 90%, moreover preferably more than 95% of the dry matter of the lignin-containing raw material is dissolved in the liquid.

Advantageously, more than 50%, preferably more than 60%, particularly preferably more than 70%, moreover preferably more than 80%, in particular more than 90%, moreover preferably more than 95% of lignin of the lignin-containing raw material is dissolved in the liquid.

Advantageously, the dry matter content of the liquid that contains the lignin-containing raw material is higher than 3%, particularly preferably higher than 4%, more particularly preferably higher than 5%.

Advantageously, the dry matter content of the liquid that contains the lignin-containing raw material is lower than 25%, preferably lower than 20%, particularly preferably lower than 18%.

In this application, all percentages given are based on the weight, unless stated otherwise.

The lignin of the lignin-containing raw material can be determined as Klason lignin and as acid-soluble lignin. Klason lignin describes, according to Tappi T 222 om-02 (https://www.tappi.org/content/SARG/T222.pdf), an analytical measurement variable after treatment in 72% $H_2SO_4$ and is the product to be quantified in this analytical method. The lignin may be, e.g., Kraft lignin, lignosulfonate or hydrolysis lignin, with lignosulfonate typically being less preferred. The lignin presents functional groups through which cross-linking is possible. The lignin can present, e.g., phenolic aromatic compounds, aromatic and aliphatic hydroxy groups and/or carboxy groups as cross-linkable units.

Preferred Embodiments of the First Process Stage

The method according to the invention comprises a first process stage, herein also referred to as step a), wherein a) lignin dissolved in the liquid is reacted with at least one cross-linking agent in the liquid at a temperature in the range from 50 to 180° C. in order to obtain dissolved modified lignin in the liquid. Expediently, the reaction is carried out in a moved liquid wherein the movement may for example be caused by stirring or recirculation of the liquid. Preferably, step a) is carried out at a pH value of the liquid in a range from 7 to 14, particularly preferably from >7 to 14, more particularly preferably from 8 to 13.5 and in particular from 9 to 13, further preferably at maximum 12, as in the case of 9 to 12, moreover preferably at maximum 11.5, as in the case of 9 to 11.5.

In a preferred embodiment of the first process stage the cross-linking agent is added to the liquid that contains the lignin-containing raw material. The cross-linking agent may optionally be added before or during the addition of the liquid to the lignin-containing raw material. In an alternative embodiment, a precursor of the cross-linking agent is added instead of the cross-linking agent, wherein in step a) the cross-linking agent is formed in situ from the precursor. The following details of the cross-linking agent also apply to cross-linking agents formed in situ from a precursor.

The cross-linking agent has at least one functional group that can react with the cross-linkable groups of the lignin. The cross-linking agent preferably has at least one functional group selected from aldehyde, carboxylic acid anhydride, epoxide, hydroxyl and isocyanate groups, or a combination thereof.

If the cross-linking agent has a functional group that can react with two cross-linkable groups of the lignin during the reaction, such as, e.g., an aldehyde, acid anhydride or epoxide group, one such functional group is sufficient. Otherwise, the cross-linking agent has at least two functional groups, such as, e.g., hydroxyl or isocyanate groups that can react with the cross-linkable groups of the lignin.

In a preferred embodiment, the at least one cross-linking agent is selected from at least one aldehyde, epoxide, acid anhydride, polyisocyanate or polyol, wherein the at least one cross-linking agent preferably is selected from aldehydes, particularly preferably formaldehyde, furfural or sugar aldehydes. A polyisocyanate is a compound with at least two isocyanate groups, wherein a diisocyanate or triisocyanate is preferred. A polyol is a compound with at least two hydroxyl groups, wherein a diol or triol is preferred.

In the first process stage (according to step a)), the lignin dissolved in a liquid and containing, e.g., phenolic aromatic compounds, aromatic and aliphatic hydroxyl groups and/or carboxylic groups as cross-linkable units, and at least one cross-linking agent that presents at least one functional group as cross-linkable unit that is capable of reacting with the cross-linkable units of the lignin are brought to react at an elevated temperature over a defined period of time, thus producing a dissolved modified lignin.

When using bifunctional cross-linking agents, two moles of cross-linkable units are available per mole of the bifunctional cross-linking agent. Accordingly, when using trifunctional cross-linking agents, three moles of cross-linkable units are available per mole of the trifunctional cross-linking agent, and so on. It should be noted here that despite the multiple functionalities of the cross-linking agents, often only a part of the available groups reacts, since the reactivity decreases as the groups react off, partly due to steric hindrance and partly due to the shifting of charges.

In the following statements, a cross-linkable unit of the cross-linking agent refers to a unit that can react with a cross-linkable unit of the lignin. A functional group that is able to react with two cross-linkable groups of the lignin during reaction, such as, e.g., an aldehyde, acid anhydride or epoxide group, counts as two cross-linkable units accordingly.

Preferably, the dosing of the cross-linking agent is carried out so that at maximum 4 mol, preferably at maximum 3 mol, more preferably at maximum 2.5 mol, particularly preferably at maximum 2 mol, even more preferably at maximum 1.75 mol, in particular at maximum 1.5 mol of cross-linkable units of the cross-linking agent are present per mole of units that are cross-linkable therewith in the lignin used.

Preferably, the dosing of the cross-linking agent is carried out such that at least 0.2 mol, preferably at least 0.5 mol, further preferably at least 0.75 mol, more preferably at least 1 mol, particularly preferably at least 1.1 mol, in particular at least 1.15 mol, of cross-linkable units of the cross-linking agent are present per mole of units that are cross-linkable therewith in the lignin used.

Preferably, the dosing of the cross-linking agent lies in the range from 0.2 mol to 4 mol, more preferably at 0.5 mol to 3 mol, particularly preferably at 1 to 2 mol.

Cross-linking agents can react in the lignin with free ortho and para positions of the phenolic rings (phenolic guaiacyl groups and p-hydroxyphenyl groups). Suitable cross-linking agents for reaction at free ortho and para positions of phenolic rings are for example aldehydes such as formaldehyde, furfural, 5-hydroxymethyl furfural (5-HMF), hydroxybenzaldehyde, vanillin, syringaldehyde, piperonal, glyoxal, glutaraldehyde or sugar aldehydes. Preferred cross-linking agents for reaction at phenolic rings are formaldehyde, furfural, and sugar aldehydes (ethanals/propanals) such as for example glyceraldehyde and glycolaldehyde.

In addition, cross-linking agents may react with aromatic and aliphatic OH groups (phenolic guaiacyl groups, p-hydroxyphenyl groups, syringyl groups) in the lignin. For this purpose, for example bifunctional and also multifunctional compounds having epoxy groups, such as glycidyl ethers, isocyanate groups, such as diisocyanate or oligomeric diisocyanate, or acid anhydrides may preferably find application. Preferred cross-linking agents for reaction at aromatic and aliphatic OH groups are polyisocyanates, in particular diisocyanates or triisocyanates, and acid anhydrides.

Moreover, cross-linking agents can also react with carboxyl groups. For this purpose, polyols, for example, in particular diols and triols may find application. Preferred cross-linking agents for reaction with carboxyl groups are diols.

In addition, cross-linking agents can react with each of phenolic rings, aromatic and aliphatic OH groups, and carboxyl groups. For this purpose, e.g., bifunctional and also multifunctional compounds having at least two of the above-mentioned cross-linking functional groups may be used.

When using cross-linking agents that react with the phenolic ring, the cross-linkable units in the lignin employed are understood as meaning phenolic guaiacyl groups and p-hydroxyphenyl groups. The concentration of cross-linkable units (mmol/g) is determined for example by means of 31P NMR spectroscopy (Podschun et al., European Polymer Journal, 2015, 67, 1-11), wherein guaiacyl groups contain one cross-linkable unit and p-hydroxyphenyl groups contain two cross-linkable units. Preferably, the lignin employed has phenolic guaiacyl groups of which at least 30%, preferably at least 40%, can be modified by means of the least one cross-linking agent in step a) of the method according to the invention. In case of employing formaldehyde as the cross-linking agent, a partial bridging in the context of a hydroxymethylation will occur.

When using cross-linking agents that react with aromatic and aliphatic OH groups, the cross-linkable units in the lignin employed are understood as meaning all aromatic and aliphatic OH groups. The concentration of cross-linkable units (mmol/g) is determined for example by means of 31P NMR spectroscopy, wherein one OH group corresponds to one cross-linkable unit.

When using cross-linking agents that react with carboxyl groups, the cross-linkable units in the lignin employed are understood as meaning all carboxyl groups. The concentration of cross-linkable units (mmol/g) is determined for example by means of 31P NMR spectroscopy, wherein one carboxyl group corresponds to one cross-linkable unit.

Preferably, the amount of cross-linking agent lies at a maximum of 35 g/100 g of lignin, preferably at a maximum of 30 g/100 g of lignin, particularly preferably at a maximum of 25 g/100 g of lignin.

If formaldehyde is employed as the cross-linking agent, the amount of formaldehyde preferably is at maximum 25 g/100 g of lignin, more preferably at maximum 20 g/100 g of lignin, particularly preferably at maximum 15 g/100 g of lignin, in particular at maximum 12 g/100 g of lignin. Thus, the amount of formaldehyde added may lie, e.g., in a range between 1-20 g/100 g of lignin, preferably between 5-15 g/100 g of lignin, particularly preferably between 6-10 g/100 g of lignin. There is also the possibility to add instead, in whole or in part, precursors of cross-linking agents, such as formaldehyde or other aldehydes, to the liquid, from which the actual cross-linking agent is formed in situ.

In an advantageous embodiment, the cross-linking agent is at least partially produced in situ during the first process stage (step a)), as already mentioned above. The advantage of producing a cross-linking agent in the first process stage is that the amount of cross-linking agent added in the first process stage can be reduced or eliminated completely.

Advantageously, the cross-linking agent is formed in situ during the first process stage, e.g., from carbohydrates, preferably cellulose, hemicelluloses or glucose, which are dispersed or dissolved in the liquid containing the dissolved lignin. Preferably, carbohydrates, preferably cellulose, hemicelluloses or glucose, may be added to the liquid that contains the dissolved lignin as a precursor of the cross-linking agent, or they may be already contained therein. In such an advantageous process sequence, for example

- in a first process stage according to step a) of the method according to the invention,
  - a carbohydrate-based cross-linking agent, preferably aldehyde, preferably glyceraldehydes or glycolaldehyde, is obtained from carbohydrates dissolved or dispersed in the liquid containing the dissolved lignin,
  - the lignin dissolved in the liquid and the carbohydrate-based cross-linking agent are brought to reaction, thus producing a dissolved modified lignin, and
- in a second process stage according to the steps b), c) and optionally d) of the method according to the invention, the dissolved modified lignin is converted into an undissolved stabilized lignin in particulate form.

Advantageously, the cross-linking agent is formed in situ during the first process stage from the lignin that is dispersed or dissolved in the liquid containing the dissolved lignin. In such an advantageous process sequence, for example

- in a first process stage according to step a) of the method according to the invention,
  - a lignin-based cross-linking agent, preferably aldehyde, preferably methandiol or glycolaldehyde, is obtained from lignin that is dissolved or dispersed in the liquid containing the dissolved lignin,
  - the remaining lignin dissolved in the liquid and the lignin-based cross-linking agent are brought to reaction, thus producing a dissolved modified lignin, and
- in a second process stage according to the steps b), c) and optionally d) of the method according to the invention, the dissolved modified lignin is converted into an undissolved stabilized lignin in particulate form.

The reaction of dissolved lignin and cross-linking agent in step a) is carried out at a temperature in the range from 50 to 180° C., preferably 60 to 130° C. and more preferably 70 to 100° C. Particularly preferably, the temperature is higher than 70° C.

The temperature of the first process stage (step a)) is advantageously higher than 50° C., preferably higher than 60° C., particularly preferably higher than 70° C. and lower than 180° C., preferably lower than 150° C., more preferably lower than 130° C., particularly preferably lower than 100° C.

Advantageously, the average residence time in the first process stage is at least 5 minutes, more preferably at least 10 minutes, even more preferably at least 15 minutes, particularly preferably at least 30 minutes, in particular at least 45 minutes, but generally less than 400 minutes, preferably less than 300 minutes.

An advantageous combination of time and temperature windows for the first process stage is a temperature in the range from 50° C. to 180° C. at a residence time of at least 15 minutes, preferably at least 20 minutes, more preferably at least 30 minutes, particularly preferably at least 45 minutes. An alternatively advantageous combination of time and temperature windows for the first process stage is a temperature in the range from 50° C. to 130° C. at a residence time of at least 10 minutes, preferably at least 15 minutes, further preferably at least 20 minutes, particularly preferably at least 30 minutes, in particular at least 45 minutes.

In a particularly preferred embodiment, the mixture of dissolved lignin in the liquid and the at least one cross-linking agent is held at a temperature between 50° C. and 180° C. for a residence time of at least 20 minutes, preferably at least 60 minutes in the first process stage.

In another particularly preferred embodiment, the mixture of dissolved lignin in the liquid and the at least one cross-linking agent is held at a temperature between 70° C. and 130° C. for a residence time of at least 10 minutes, preferably at least 50 minutes in the first process stage.

In another particularly preferred embodiment, the mixture of dissolved lignin in the liquid and the at least one cross-linking agent is held at a temperature between 50° C. and 110° C., particularly preferably between more than 70° C. and 110° C., for a residence time of at least 10 minutes, preferably at least 180 minutes in the first process stage.

Advantageously, it is possible to realize a heating of the liquid containing the dissolved lignin and the cross-linking agent during the first process stage. Here, the heating rate is preferably lower than 15 Kelvin per minute, more preferably lower than 10 Kelvin per minute and particularly preferably lower than 5 Kelvin per minute.

Advantageously, the temperature in the first process stage is held largely constant over a time of at least 5 minutes, preferably at least 10 minutes, further preferably at least 15 minutes, particularly preferably at least 30 minutes.

A combination of heating and holding the temperature constant in the first process stage is also advantageous.

The pressure in the first process stage is preferably at least 0.1 bar, more preferably at least 0.2 bar and preferably at maximum 5 bar above the saturated steam pressure of the liquid containing the lignin. The reaction can be carried out, e.g., at a pressure in the range from atmospheric pressure to 1 bar above atmospheric pressure, in particular at a pressure that lies preferably up to 500 mbar above atmospheric pressure.

Preferred Dissolved Modified Lignins

From the first process stage, a mixture emerges that comprises a dissolved modified lignin and a liquid and is suitable for producing stabilized lignin particles therefrom in a second process stage.

It has been found that the following properties of the mixture discharged from the first process stage and introduced into the second process stage are particularly suitable for successful process management:

- Advantageously, more than 50%, preferably more than 60%, particularly preferably more than 70%, moreover preferably more than 80%, in particular more than 90% of the dry matter of the mixture is dissolved in the liquid.

Advantageously, more than 50%, preferably more than 60%, particularly preferably more than 70%, moreover preferably more than 80%, in particular more than 90% of the lignin of the mixture is dissolved in the liquid.

Advantageously, the dry matter content of the mixture is higher than 3%, particularly preferably higher than 4%, even more particularly preferably higher than 5%.

Advantageously, the dry matter content of the mixture is lower than 25%, preferably lower than 20%, particularly preferably lower than 18%.

Advantageously the aromatic compounds of the lignin contained are mainly bound via ether linkages.

Advantageously, the proportion of para-substituted phenolic rings in the total proportion of aromatic rings is higher than 95%, preferably higher than 97%, in particular higher than 99%.

Advantageously, the content of free phenol is lower than 200 ppm, preferably lower than 100 ppm, moreover lower than 75 ppm, particularly preferably lower than 50 ppm.

Advantageously, the content of Klason lignin relative to the dry matter is at least 70%, preferably at least 75%, particularly preferably at least 80%, in particular at least 85%.

Advantageously, the proportion of guaiacyl and p-hydroxyphenyl units with a free ortho position in the phenolic ring is lower than 50%, preferably lower than 40%, particularly preferably lower than 30% of the total of phenolic OH groups.

The content of free phenol is determined according to DIN ISO 8974. The content of Klason lignin is determined as acid-insoluble lignin according to TAPPI T 222. The quantification and qualification of the OH groups are determined by means of 31P-NMR according to M. Zawadzki, A. Ragauskas (Holzforschung 2001, 55, 3).

It is assumed that a modified dissolved lignin is obtained by the reaction, wherein the lignin has reacted with the cross-linking agent, but the cross-linking via the cross-linking agent has taken place only partially or not at all. In other words, the molecule of the cross-linking agent can be bound to lignin at one location, but another binding of the molecule to lignin with formation of the cross-linking is carried out only partially, if at all.

Preferred Embodiments of the Second Process Stage

Advantageous embodiments of the production of particles from the dissolved modified lignin in the presence of the liquid will be disclosed in the following: The second process stage comprises a precipitation step (step b)) and a separation step (step c)), wherein, in order to stabilize the lignin particles, a heat treatment is carried out in step b) after precipitation and/or a heat treatment is carried out following step c) in an additional step d). The second process stage thus comprises the step b) and the step c), and optionally the additional step d).

The stabilization of the lignin particles may thus be carried out in the wet (step b)) and/or in the dry (step d)). The stabilization of the lignin particles may be performed either in step b) or in an additional step d), or it can be performed in both step b) and step d).

The method according to the invention comprises in step b) precipitating the dissolved modified lignin obtained in step a) by mixing the liquid with a precipitating agent at a temperature in the range from 0 to below 150° C. in order to form lignin particles in the liquid. Preferably, the precipitation according to step b) is carried out at a temperature in a range from 0 to below 100° C., particularly preferably of 0 to below 80° C., further preferably 0 to 50° C., more particularly preferably of 0 to below 40° C., in particular of 10 to below 30° C. Preferably, the temperature is at least 10° C., further preferably at least 15° C., moreover preferably at least 20° C.

In this step, the liquid obtained from step a) that contains the dissolved modified lignin is mixed with a precipitating agent. Here, the precipitating agent may be added to the liquid or the liquid is added to the precipitating agent. Mixing may be supported by movement that is caused by stirring or recirculating the liquid, for which common mixing devices may be employed.

Precipitating agents are substances or mixtures of substances which cause the precipitation of dissolved substances as insoluble solids (the precipitate). In the present case, the precipitating agent causes the formation of the lignin particles (solid particles) as insoluble solid matter in the liquid, so that a dispersion or slurry of the lignin particles in the liquid is obtained. It should be clear that the selection of a suitable precipitating agent will inter alia be dependent from the type of liquid employed.

Examples for advantageous precipitating agents are acids, in particular aqueous acids, preferably sulfuric acid, acetic acid or formic acid, or acidic gases, such as, e.g., $CO_2$ or $H_2S$, or a combination of $CO_2$ or $H_2S$, in particular if the mixture entering the first process stage has a pH value of more than 5, preferably more than 6, further preferably more than 7, particularly preferably more than 8.

Another example for an advantageous precipitating agent is water, in particular if the mixture entering the first process stage contains alcohols or carboxylic acids.

Another example for an advantageous precipitating agent are salts, salt mixtures and aqueous solutions containing salts, in particular the salts or with the salts of the alkali and alkaline earth metals, in particular with oxygen-containing anions, preferably sulfates, carbonates and phosphates, in particular preferably sodium salts, such as, e.g., sodium carbonate and/or sodium sulfate, or mixtures thereof, as well as aqueous solutions containing such salts or mixtures thereof.

In a preferred embodiment, the precipitating agent is selected from at least one acid, preferably aqueous acid, acidic gas, base, preferably aqueous base, water, or salt, preferably a saline aqueous solution, wherein the precipitating agent preferably is selected from an acid, preferably an aqueous acid, and water. Preferred concentrations of an aqueous acid employed in water are less than 20%, further preferably less than 15%, moreover preferably less than 10%.

If the liquid obtained from step a) is or comprises an aqueous base, preferably sodium hydroxide, the precipitating agent preferably is an acid, preferably an aqueous acid. If the liquid obtained from step a) is or comprises a carboxylic acid, preferably formic acid and/or acetic acid, or at least one alcohol, preferably ethanol, the precipitating agent preferably is water.

It is preferred that the pH value of the liquid after mixing with the precipitating agent and optionally a precipitation additive in step b) is lower than 10.

Advantageously, the production of the particles from the dissolved modified lignin in the presence of the liquid in the second process stage is carried out by precipitation at a pH value of lower than 10, preferably lower than 9.5, preferably lower than 9, preferably lower than 8.5, preferably lower than 8, preferably lower than 7.5, preferably lower than 7, preferably lower than 6.5, preferably lower than 6, preferably lower than 5.5, preferably lower than 5, preferably lower than 4.5, preferably lower than 4, preferably lower than 3.5, preferably lower than 2 or preferably lower than 1.5 or lower than 1.0 or lower than 0.5 or as low a pH value as 0. Advantageously, however, the production of the particles from the dissolved modified lignin in the presence of the liquid in the second process stage is carried out by precipitation at a pH value in a range from 0.5 to 9, particularly preferably from 1.0 to 8.5, more particularly preferably from 1.5 to 8.0, even more preferably from 2.0 to 7.5, even more preferably from 2.5 or >2.5 to 7.0, even more preferably from >2.5 or 3.0 to 6.0, most preferably from >2.5 or 3.0 to <6.0 or <5.5.

Advantageously, the production of the particles from the dissolved modified lignin in the presence of the liquid in the second process stage is carried out by precipitation through lowering the pH value to less than 10, preferably less than 9.5, preferably less than 9, preferably less than 8.5, preferably less than 8, preferably less than 7.5, preferably less than 7, preferably less than 6.5, preferably less than 6, preferably less than 5.5, preferably less than 5, preferably less than 4.5, preferably less than 4, preferably less than 3.5. Advantageously, the production of the particles from the dissolved modified lignin in the presence of the liquid in the second process stage is carried out by precipitation through lowering the pH value to a range from 0.5 to 9, particularly preferably from 1.0 to 8.5, more particularly preferably from 1.5 to 8.0, even more preferably from 2.0 to 7.5, even more preferably from 2.5 or >2.5 to 7.0, even more preferably from >2.5 or 3.0 to 6.0, most preferably from >2.5 or 3.0 to <6.0 or <5.5.

During the production of lignin particles from the dissolved modified lignin in the presence of the liquid, the pH value is preferably lowered to such an extent that the mixture of particles and liquids does not form a gel, or that any gel possibly formed is dissolved again. According to the invention, the lignin in particular is present in particulate form, and not in the form of a gelled liquid, during separation in step c), i.e., before dispersion.

Precipitation is carried out by mixing the liquid with the precipitating agent at a temperature in the range from 0 to below 150° C. Preferably, the precipitation is carried out at a temperature in a range from 0 to below 100° C., particularly preferably of 0 to below 80° C., further preferably 0 to 50° C., more particularly preferably from 0 to below 40° C., in particular from 10 to below 30° C. Preferably, the temperature is at least 10° C., further preferably at least 15° C., moreover preferably at least 20° C. During precipitation, lignin particles are formed from the dissolved modified lignin. Any optionally further treatment in step b) will depend from which of the following alternatives for the stabilization of the formed lignin particles is carried out. In any case, step b), which may contain an aging or heat treatment after precipitation, will be carried out until the separation of the liquid from the lignin particles, in general in a temperature range from 0 to below 150° C.

To stabilize the lignin particles, the liquid mixed with the precipitating agent is heat-treated at a temperature in the range from 60 to 200° C., preferably from 80 to 170° C., particularly preferably von 80° C. or 100° C. to 160° C., more particularly preferably from 80° C. to below 150° C., and/or in an additional step d) after step c), the lignin particles separated from the liquid are heat-treated at a temperature in the range from 60 to 600° C.

In the case that the stabilization of the lignin particles is carried out by heat treatment in the additional step d), the precipitation in step b) is carried out preferably at a temperature of the liquid in the range from 0 to below 100° C., preferably 0 to below 90° C. In this case, the precipitation can be carried out, e.g., at ambient temperature, e.g., in the range from 10 to 40° C. Preferably, the precipitation is however carried out at a temperature in a range from 0 to below 40° C., in particular from 10 to below 30° C. Even if no heat treatment for the stabilization should be carried out in step b), it may be optionally appropriate to hold the formed lignin particles in the liquid for a certain time, e.g., at the temperatures mentioned above, for aging.

In the case that the stabilization of the lignin particles is carried out by the heat treatment of the liquid mixed with the precipitating agent in step b), the heat treatment in step b) preferably may be carried out at a temperature of the liquid in the range from 60 to 200° C., preferably from 80 to 170° C., particularly preferably from 80° C. or 100° C. to 160° C., more particularly preferably from 80 to below 150° C., more preferably 90 to 148° C., even more preferably 100 to 148° C. In this instance of the heat treatment in step b) the temperature is preferably at maximum 180° C. or at maximum 160° C. or at maximum below 150° C. or at maximum 140° C., particularly preferably at maximum 130° C., more preferably at maximum 120° C., in particular at maximum 110° C., as well as at least 80° C., preferably at least 90° C., particularly preferably at least 100° C. The formed lignin particles can be stabilized by the heat treatment. The maximum temperature preferably is below 150° C., at least if a base, preferably an aqueous base, is employed as the precipitating agent Preferably, the heat treatment in step b) is carried out after precipitation in one of the temperature ranges mentioned above, for a duration of at least 2 minutes, at least 3 minutes, at least 4 minutes, at least 5, 6, 7, 8, 9 or at least 10 minutes, preferably at least 11, 12, 13, 14, 15, 16, 17, 17, 19 or at least 20 minutes, particularly preferably at least 21, 22, 23, 24 or 25 minutes or at least 30, 35, 40, 45, 50, 55, 60, 65, 70, 75, 80, 85, 90, 95 or 100 minutes. Preferably, the duration of the heat treatment after precipitation in step b) is in a range from 5 or 7.5 minutes to 5 hours, preferably from 10 or 12.5 minutes to 4.5 hours, particularly preferably from 15 or 17.5 minutes to 4 hours, more particularly preferably from 20 or 22.5 minutes to 3.5 hours, in particular from 25, 27.5 or 30 minutes to 3 hours. Preferably, the maximum duration of the heat treatment in step b) is 5.5, 5, 4.5, 4, 3.5, 3, 2.5, 2, 1.5 or 1 hour(s). As already mentioned above, the alkaline solubility of the lignin particles and/or the content of organic compounds that can be outgassed therefrom (emissions), as determined by thermal desorption analysis according to VDA 278 (May 2016), can be positively influenced or adjusted by the duration of the treatment. The particle size and the STSA surface area can also be influenced.

Advantageously, a precipitation additive is employed in addition to the precipitating agent for the precipitation. The precipitation additive can be added to the liquid before, during or after the mixing with the precipitating agent. The precipitation additive causes an increase or improvement of the solvatization of the dissolved modified lignin and/or of the lignin particles. Examples for suitable precipitating additives are organic solvents, such as alcohols, e.g., ethanol, or ketones, e.g., acetone. Acetone is a preferred precipitation additive.

Step b) may be carried out at atmospheric pressure or under positive pressure. In particular if step b) is carried out at an elevated temperature, e.g., at 80° C. or more, in particular 90° C. or more, it is preferred to employ positive pressure, e.g., at maximum 5 bar above saturated steam pressure. It is advantageous to carry it out under positive pressure to prevent any evaporation of the liquid to the largest extent possible.

In a preferred embodiment, the dry matter content of the liquid in step b) after the mixture with precipitating agent and optionally the precipitation additive is at least 2% by weight, particularly preferably at least 3% by weight, more particularly preferably at least 4% by weight. Here, the dry matter content is preferably <26% by weight, particularly preferably <24% by weight, more particularly preferably <20% by weight, respectively.

After precipitation and an optionally conducted heat treatment or aging of the liquid with the lignin particles formed therein, the liquid is separated, in step c), from the lignin particles formed in step b). Advantageous embodiments of the separation of the liquid from the particles are disclosed in the following:

For the separation of the formed lignin particles from the liquid, all common solid-liquid separation methods may be employed. Preferably, the liquid is separated from the particles by filtration or centrifugation. When using filtration or centrifugation, a dry matter content of more than 15%, preferably more than 20%, further preferably more than 25%, particularly preferably more than 30%, and less than 60%, preferably less than 55%, further preferably less than 50%, particularly preferably less than 45%, moreover preferably less than 40% is preferably achieved. Another possibility for separating the lignin particles is the evaporation of the liquid, e.g., at an elevated temperature and/or reduced pressure. The separation typically also comprises washing and/or drying. The washing solution employed for washing preferably has a pH value that lies in the slightly alkaline range, particularly preferably in a range from >7.0 to 10, preferably >7 to 9, further preferably >7 to 8.5.

Following the separation, in particular by centrifugation or filtration, washing of the particles with a liquid may advantageously be carried out. Preferably, the pH value of the washing liquid used differs only by at maximum 4, preferably at maximum 2 units from the pH value of the liquid before the separation of the particles.

Finally, the washed lignin particles are typically dried, wherein at least a part of the remaining liquid is removed preferably by its evaporation, e.g., by heating and/or pressure reduction. If the additional step d) described hereinafter is carried out, the drying may be, as a whole or partially, part of the stabilization in step d). The lignin particles separated from the liquid, that are employed in step d), may already be dried in part or may still contain a residual proportion of liquid. In the course of the heat treatment, at least a part of the residual liquid may then be evaporated. Regardless of whether an additional step d) is carried out or not, it is preferred to obtain dried stabilized lignin particles as the final product. Preferably, the dry matter content is higher than 90%, more preferably higher than 92%, in particular higher than 95%. In the present invention, dry particles are thus understood to be particles with a dry matter content of more than 90%, more preferably of more than 92%, in particular of more than 95%.

As described, a stabilization of the formed lignin particles is carried out in an additional step d) after step c), as an alternative or in addition to the stabilization of the lignin particles in liquid in step b). Here, the lignin particles separated from the liquid, in particular the dry particles, are heat-treated at a temperature in the range from 60 to 600° C., wherein the temperature preferably is in the range from 80 to 400° C., more preferably 80 to 300° C., further preferably 80 to 240° C., even more preferably 90 to 130° C. It may be useful to carry out the heat treatment in vacuum or under reduced oxygen content through the use of inert gases, e.g., at less than 5 percent by volume of $O_2$, in particular if the temperature is above 150° C., in order to protect the particles by inerting against any undesired reactions. The duration of the heat treatment strongly depends from the temperature employed, may however be, e.g., in the range from 1 minutes to 48 hours, preferably from 1 minute to 24 hours, preferably 10 minutes to 18 hours or 30 minutes to 12 hours.

In a preferred embodiment, the conversion of the modified lignin dissolved in a liquid into stabilized lignin particles in the process stage is carried out in several process steps, wherein at least the following steps are passed: Production of lignin particles from the dissolved modified lignin in the presence of a liquid in step b), separation of the liquid from the particles in step c), drying and heat treatment by heating the dried lignin particles in step d).

The temperature of the heat treatment for the stabilization of the lignin particles in step d) is at maximum 600° C., e.g., preferably at maximum 550° C., at maximum 500° C., at maximum 475° C., at maximum 450° C., at maximum 425° C., at maximum 400° C., at maximum 375° C., at maximum 350° C., at maximum 325° C., at maximum 300° C., at maximum 270° C., at maximum 260° C., at maximum 250° C., at maximum 240° C., at maximum 230° C., at maximum 220° C., at maximum 215° C.

Advantageously, the drying of the particles is carried out at least partially by evaporation of the liquid, wherein the temperature of the particles during the evaporation is at maximum 150° C., preferably at maximum 130° C., particularly preferably at maximum 120° C., even more preferably at maximum 110° C., particularly preferably at maximum 100° C., in particular preferably at maximum 90° C.

Advantageously, the heating of the dried particles in the second process stage is carried out up to a particle temperature of at least 60° C., preferably at least 80° C., 90° C., 100° C., 110° C., 120° C., 130° C., 140° C., 150° C., 160° C., 170° C., 180° C., 190° C., 200° C.

Advantageously, the heating of the dried particles in the second process stage is carried out up to a particle temperature of at maximum 600° C., preferably at maximum 550° C., 500° C., 475° C., 450° C., 425° C., 400° C., 375° C., 350° C., 325° C., 300° C., 270° C., 260° C., 250° C., 240° C., 230° C., 220° C., 215° C.

The heat treatment of the dry lignin particles may be carried out, e.g., at a pressure in a range from at least 200 mbar, preferably from at least 500 mbar, particularly preferably from at least 900 mbar to at maximum 1500 mbar.

Preferred Stabilized Lignin Particles

The method according to the invention serves for the production of a stabilized lignin in particulate form. Preferably, the stabilized lignin obtained after step c) or after step d) is not subjected to any further reaction by which sulphonic acid groups and/or other anions are introduced. In particular, no sulphonation of the stabilized lignin obtained after step c) or after step d) is carried out. In particular, the whole method according to the invention does not provide any sulphonation step. The lignin obtained by the method according to the invention is present in particulate form, i.e., as lignin particles, wherein the final product obtained in the method preferably is a dry or dried powder. Thus, they are solid particles that can be present dispersed in a liquid or as a dried or dry powder. The stabilization of the lignin results in improved properties, e.g., in a reduced solubility in alkaline liquids and/or an increased glass transition point or no measurable glass transition point at all. Stabilized lignin particles are in particular preferably lignin particles with a glass transition temperature of more than 160° C., preferably more than 180° C., particularly preferably more than 200° C., in particular more than 250° C. Preferably, no glass transition temperature at all can be measured for the stabilized lignin particles.

Measurement of the glass transition temperature is carried out according to DIN 53765.

The stabilized lignin particles obtained by the method according to the invention have other advantageous particle properties that allow for their employment in material applications. Preferably, the lignin particles are ground after step d), particularly preferably to such an extent that they exhibit a d50 value and/or a d99 value as defined hereinafter.

Preferably, the stabilized lignin particles have a d50 value (volume average) of the particle size distribution of less than 500 μm, preferably less than 300 μm, further preferably of less than 200 μm, in particular less than 100 μm, in particular preferably less than 50 μm, most preferably less than 20 μm.

Preferably, the stabilized lignin particles have a d99 value (volume average) of the particle size distribution of less than 600 μm, preferably less than 400 μm, further preferably of less than 300 μm, in particular less than 250 μm, in particular preferably less than 200 μm, most preferably less than 150 μm.

Furthermore, the parameters d50 and d90 as well as d99 of the particle size distributions of the dried, stabilized lignin particles at the end of the second process stage are preferably increased, by a maximum of 20 times, further preferably by a maximum of 15 times, particularly preferably by a maximum of 10 times, in particular by a maximum of 5 times, compared to the point in time before the separation of the liquid in the second process stage, respectively.

Measurement of the particle size distribution of the stabilized lignin is carried out in a suspension with distilled water by means of laser diffraction according to ISO 13320.

Before and/or during measurement of the particle size distribution, the sample to be measured is dispersed by means of ultrasound until a particle size distribution is reached that remains stable over several measurements. This stability is reached if the individual measurements of a series of measurements, e.g., of the d50, do not differ from one another by more than 5%.

Preferably, the stabilized lignin particles have an STSA of at least 2 $m^2/g$, preferably of at least 5 $m^2/g$, further preferably of at least 10 $m^2/g$, further preferably at least 20 $m^2/g$. Preferably, the STSA is less than 200 $m^2/g$, particularly preferably less than 180 $m^2/g$, further preferably less than 150 $m^2/g$, in particular preferably less than 120 $m^2/g$. Here, the STSA (statistical thickness surface area) is a characterization of the outer surface area of the stabilized lignin particles.

In a variant of the present stabilized lignin or particulate carbon material, the STSA surface area exhibits values between 10 $m^2/g$ and 180 $m^2/g$, preferably between 20 $m^2/g$ and 180 $m^2/g$, further preferably between 35 $m^2/g$ and 150 or 180 $m^2/g$, particularly preferably between 40 $m^2/g$ and 120 or 180 $m^2/g$.

Advantageously, the BET surface area of the present stabilized lignin differs only by at maximum 20%, preferably by at maximum 15%, more preferably by at maximum 10% from the STSA surface area. The BET surface area is determined as the total surface area from outer and inner surface area by means of nitrogen adsorption according to Brunauer, Emmett and Teller.

Further, the BET and STSA surface area after heating the dried lignin particles in step d) at the end of the second process stage is at least 30%, further preferably at least 40%, particularly preferably at least 50%, as compared to the point in time before the heating of the dried lignin particles in the second process stage.

Preferably, the stabilized lignin particles produced by the method according to the invention have only low porosity. Advantageously, the pore volume of the stabilized lignin particles is <0.1 $cm^3/g$, further preferably <0.01 $cm^3/g$, particularly preferably <0.005 $cm^3/g$. Thus, the present stabilized lignin differs from finely divided porous materials such as ground biogenic activated carbon powder, which, in addition to a BET surface area of usually more than 500 $m^2/g$, can also have an STSA surface area of at most 10 $m^2/g$.

The lignin particles according to the invention differ from lignin-based resins that are generated by a reaction with formaldehyde and converted from the solution to a duromer via the gel state, preferably in the preferred advantageous particle properties, for example the d50 value of the particle size distribution of less than 500 μm or the STSA of more than 10 $m^2/g$, preferably more than 20 $m^2/g$.

Determination of the BET surface area and the STSA surface area is carried out according to the ASTM D 6556-14 standard. In contrast thereto, the sample preparation/outgassing for the measurement of STSA and BET is carried out at 150° C. in the present invention.

Preferably, the lignin particles obtained according to the invention are soluble in alkaline liquids only conditionally. Preferably, the solubility of the stabilized lignin is lower than 30%, particularly preferably lower than 25%, more particularly preferably lower than 20%, even more preferably lower than 15%, even more preferably lower than 10%, further preferably lower than 7.5%, even more preferably lower than 5%, even more preferably lower than 2.5%, in particular preferably lower than 1%.

The alkaline solubility of the stabilized lignin is determined as follows:

1. To determine the solubility of a solid substance sample, it must be present in the form of a dry, fine powder (DS>98%). If this is not the case, the dry sample is ground or thoroughly mortared before determining the solubility.
2. The solubility is determined in triplicate. For this purpose, 2.0 g of dry filler each are weighed into 20 g 0.1 M NaOH each, respectively. If the determined pH value of the sample however is <10, the sample is discarded, and 2.0 g of dry filler are weighed into 20 g 0.2 M NaOH each instead. In other words, depending from the pH value (<10 or >10), either 0.1 M NaOH is used (pH>10) or 0.2 M NaOH (pH<10) is used.
3. The alkaline suspension is shaken at room temperature for 2 hours, at a shaker rate of 200 per minute. If the liquid should contact the lid in the process, the shaker rate has to be reduced to prevent this from happening.
4. Then, the alkaline suspension is centrifuged at 6000×g.
5. The supernatant of the centrifugation is filtered through a Por 4 frit.
6. The solid after centrifugation is washed twice with distilled water, by repetition from 4. to 6.
7. The solid is dried in the drying oven for at least 24 h at 105° C. until the weight remains constant.
8. The alkaline solubility of the lignin-rich solid matter is calculated as follows: Alkaline solubility of lignin-rich solid matter [%]=Mass of the undissolved proportion after centrifugation, filtration and drying [g]*100/mass of the dry product obtained in pos. 2. [g]

The invention also relates to stabilized lignin particles that are obtainable by the method according to the invention, as described hereinabove, wherein the stabilized lignin particles

- have a d50 value of the particle size distribution, relative to the volume average, of less than 500 μm, preferably less than 50 μm, even more preferably less than 20 μm, and/or
- have an STSA surface area in the range from 2 $m^2/g$ to 180 $m^2/g$, preferably from 10 $m^2/g$ to 150 or 180 $m^2/g$, more preferably 40 $m^2/g$ to 120 or 180 $m^2/g$.

According to the invention, stabilized lignin particles having one or more of the following properties can also be obtained, wherein the particles preferably are obtainable by the method according to the invention as described hereinabove:

- an STSA of at least 2 $m^2/g$, preferably of 10 $m^2/g$, further preferably at least 20 $m^2/g$, even further preferably at least 40 $m^2/g$. Preferably, the STSA is less than 180 $m^2/g$, more preferably less than 150 $m^2/g$, even more preferably less than 120 $m^2/g$
- a signal in the solid state 13C-NMR at 0 to 50 ppm, preferably at 10 to 40 ppm, particularly preferably at 25 to 35 ppm, having an intensity relative to the signal of the methoxy groups at 54 to 58 ppm of 1-80%, preferably 5-60%, in particular preferably 5-50%, and a 13C-NMR signal at 125 to 135 ppm, preferably at 127 to 133 ppm, that is increased in comparison to the lignin employed
- a $^{14}C$ content, preferably higher than 0.20 Bq/g of carbon, in particular preferably higher than 0.23 Bq/g of carbon, but preferably lower than 0.45 Bq/g of carbon, preferably lower than 0.4 Bq/g of carbon, particularly preferably lower than 0.35 Bq/g of carbon
- a carbon content relative to the ash-free dry substance between 60% by mass and 80% by mass, preferably between 65% by mass and 75% by mass
- a glass transition temperature of more than 160° C., further preferably of more than 180° C., particularly preferably of more than 200° C., in particular of more than 250° C. Preferably, no glass transition temperature at all can be measured for the stabilized lignin particles.
- a pore volume of the stabilized lignin particles of less than 0.1 $cm^3/g$, further preferably less than 0.01 $cm^3/g$, particularly preferably less than 0.005 $cm^3/g$.
- a proportion of volatile constituents according to DIN 51720 of more than 5%, preferably of more than 10%, particularly preferably of more than 15%, moreover preferably of more than 20%, moreover particularly preferably of more than 25%, in particular moreover preferably of more than 30%, in particular of more than 35%.
- a proportion of volatile constituents according to DIN 51720 of less than 60%, preferably of less than 55%, particularly preferably of less than 50%.
- an alkaline solubility of less than 30%, preferably of less than 25%, particularly preferably of less than 20%, moreover preferably of less than 15%, moreover particularly preferably of less than 10%, in particular of less than 5%,
- an alkaline solubility of more than 0.5%, preferably of more than 1%, moreover preferably of more than 2.5%, or of lower than 30%, particularly preferably lower than 25%, more particularly preferably lower than 20%, even more preferably lower than 15%, even more preferably lower than 10%, even more preferably lower than 5%, in particular preferably lower than 1%.
- an oxygen content in a range from >8% by weight to <30% by weight, preferably from >10% by weight to <30% by weight, particularly preferably from >15% by weight to <30% by weight, more particularly preferably from >20% by weight to <30% by weight, relative to the ash-free dry substance, respectively.
- a content of syringyl building blocks preferably in a range lower than 5.0%, particularly preferably lower than 4.0%, wherein % stands for % by weight and is to be understood relative to the total weight of the lignin particles,
- a pH value of at least 6, preferably at least 7, further preferably at least 7.5 and at maximum 10, preferably at maximum 9, further preferably at maximum 8.5.

Preferably, the stabilized lignin particles have a proportion of compounds soluble in an alkaline medium of less than 30%, preferably of less than 25%, particularly preferably of less than 20%, moreover preferably of less than 15%, moreover particularly preferably of less than 10%, in particular of less than 5%, most preferably of less than 1%, with respect to the total weight of the particles, respectively, wherein the alkaline medium represents an aqueous solution of NaOH (0.1 mol/l or 0.2 mol/l), and the proportion is determined according to the method described in the description. Here, % is to be understood as % by weight.

Preferably, the stabilized lignin particles have a proportion of organic compounds that can be outgassed therefrom (emissions), as determined by thermal desorption analysis according to VDA 278 (May 2016), that lies at <200 μg/g of lignin particles, particularly preferably at <175 μg/g of lignin particles, more particularly preferably at <150 μg/g of lignin particles, further preferably at <100 μg/g of lignin particles, more preferably at <50 μg/g of lignin particles, in some instances at <25 μg/g of lignin particles.

Examples of such outgassable organic compounds are vanillin, ethanol and 4-hydroxy-3-methoxyacetophenone. Preferably, the content of the outgassable individual components vanillin, ethanol or 4-hydroxy-3-methoxyacetophenone is more than 1 μg/g, preferably more than 2 μg/g.

Preferably, the stabilized lignin particles have a proportion of the outgassable single components

- 2-methoxyphenol
- phenol
- guaiacol
- 4-methoxy-3-methyl-phenol
- 4-propanolguaiacol
- apocynin
- 2-methoxy-4-methylphenol
- 2-methoxy-4-ethylphenol
- 4-propylguaiacol
- dimethyl trisulfide
- methanol
- ethanol
- syringol
- vanillin
- 1,2-dimethoxybenzene
- hydroxy-dimethoxyethanone and/or
- coniferyl aldehyde as determined by thermal desorption analysis according to VDA 278 (May 2016), respectively, of less than 50 μg/g of lignin particles, preferably of 25 μg/g of lignin particles, particularly preferably of less than 15 μg/g of lignin particles, moreover preferably of less than 10 μg/g of lignin particles, in particular preferably of less than 5 μg/g of lignin particles, in some instances of less than 1 μg/g of lignin particles.

Preferably, the stabilized lignin particles have a $^{14}C$ content that is higher than 0.20 Bq/g of carbon, in particular preferably higher than 0.23 Bq/g of carbon, but preferably lower than 0.45 Bq/g of carbon, even more preferably lower than 0.4 Bq/g of carbon, particularly preferably lower than 0.35 Bq/g of carbon, and/or have a carbon content relative to the ash-free dry substance between 60% by mass and 80% by mass, preferably between 65% by mass and 75% by mass.

In another aspect, the invention further relates to lignin particles, wherein the lignin particles

- have a d50 value of the particle size distribution, relative to the volume average, of less than 500 μm, preferably less than 50 μm, more preferably of less than 20 μm, and/or
- have an STSA surface area in the range from 2 $m^2/g$ to 180 $m^2/g$, preferably 10 $m^2/g$ to 180 $m^2/g$, preferably from 20 $m^2/g$ to 180 $m^2/g$, further preferably from 35 $m^2/g$ to 150 or 180 $m^2/g$, particularly preferably from 40 $m^2/g$ to 120 or 180 $m^2/g$,
- wherein the particles have a proportion of compounds soluble in an alkaline medium of less than 30%, preferably of less than 25%, particularly preferably of less than 20%, more preferably of less than 15%, more particularly preferably of less than 10%, further preferably of less than 7.5%, in particular of less than 5%, most preferably of less than 2.5% or of less than 1%, with respect to the total weight of the particles, respectively, wherein the alkaline medium represents an aqueous solution of NaOH (0.1 mol/l or 0.2 mol/l), and the proportion is determined according to the method described in the description, and/or the particles have a proportion of organic compounds that can be outgassed therefrom (emissions), as determined by thermal desorption analysis according to VDA 278 (May 2016), that lies at <200 μg/g of lignin particles, particularly preferably at <175 μg/g of lignin particles, more particularly preferably at <150 μg/g of lignin particles, further preferably at <100 μg/g of lignin particles, more preferably at <50 μg/g of lignin particles, in some instances at <25 μg/g of lignin particles.

Preferably, these lignin particles have a $^{14}C$ content that is higher than 0.20 Bq/g of carbon, in particular preferably higher than 0.23 Bq/g of carbon, but preferably lower than 0.45 Bq/g of carbon, even more preferably lower than 0.4 Bq/g of carbon, particularly preferably lower than 0.35 Bq/g of carbon, and/or have a carbon content relative to the ash-free dry substance between 60% by mass and 80% by mass, preferably between 65% by mass and 75% by mass.

Another aspect of the present invention is a use of the lignin particles as filler, in particular in rubber compositions.

Another aspect of the present invention is a rubber composition comprising at least one rubber component and at least one filler component, wherein the filler component contains lignin particles according to the invention as the filler, wherein the rubber composition preferably is vulcanizable.

The rubber composition may moreover contain at least one vulcanization system that comprises at least one cross-linking agent. Examples for such cross-linking agents are sulfur and/or peroxide.

The lignin particles according to the invention may be employed in the rubber composition, e.g., in an amount of 10% by weight to 150% by weight, preferably 20% by weight to 120% by weight, more preferably 40% by weight to 100% by weight, particularly preferably 50% by weight to 80% by weight, relative to the weight of the rubber employed for the rubber composition.

From the rubber composition, a rubber article, in particular a technical rubber article or tire, is obtained by cross-linking. Rubber articles are articles based on rubber or a rubber elastomer, i.e., vulcanized rubber, that serves as the matrix material for the article. Rubber articles, especially technical rubber articles or tires, are sometimes also called rubber goods (Gummiwaren, Kautschukartikel or Kautschukwaren in German language). One of the technical terms for technical rubber articles in English is "Mechanical Rubber Goods" (abbreviated as MRG). Examples for rubber articles, in particular technical rubber articles or tires, are vehicle tires, sealing profiles, belts, bands, conveyor belts, hoses, spring elements, rubber-metal composite parts, roller linings, molded articles, seals and cables.

In a preferred embodiment, the rubber article, in particular the technical rubber article or tire, may contain additional fillers, in particular carbon black and/or silicic acid and/or other inorganic or surface-treated inorganic fillers, such as, e.g., chalk and silica.

Preferred are rubber articles, preferably profiles, cables or seals, that contain the lignin particles according to the invention in a proportion of at least 10% by weight, preferably at least 20% by weight, moreover preferably at least 30% by weight, and that contain a proportion of organic compounds that can be outgassed therefrom (emissions), as determined by thermal desorption analysis according to VDA 278 (May 2016) that lies at <200 μg/g of the rubber article, particularly preferably at <175 μg/g of the rubber article, more particularly preferably at <150 μg/g of the rubber article, moreover preferably at <100 μg/g of the rubber article, in particular preferably at <50 μg/g of the rubber article, in single instances at <25 μg/g of the rubber article.

Preferred are rubber articles that contain the lignin according to the invention in a proportion of at least 10% by weight, preferably at least 20% by weight, moreover preferably at least 30% by weight, in particular preferably at least 40% by weight and exhibit swelling, as determined according to DIN ISO 1817:2015 in 0.1 mol NaOH, of at maximum 30%, preferably at maximum 25%, further preferably at maximum 20%, moreover preferably at maximum 15%, in particular at maximum 10%, in single instances at maximum 5%.

Determination Methods:

1. Determination of the BET and STSA Surface Area

The specific surface area of the product to be investigated was determined by nitrogen adsorption according to the ASTM D 6556 (2019-01-01) standard provided for industrial carbon blacks. According to this standard, the BET surface area (specific total surface area according to Brunauer, Emmett and Teller) and the external surface area (STSA surface area; Statistical Thickness Surface Area) were determined as follows.

The sample to be analyzed was dried to a dry substance content≥97.5% by weight at 105° C. prior to the measurement. In addition, the measuring cell was dried in a drying oven at 105° C. for several hours before weighing in the sample. The sample was then filled into the measuring cell using a funnel. In case of contamination of the upper measuring cell shaft during filling, it was cleaned using a suitable brush or a pipe cleaner. In the case of strongly flying (electrostatic) material, glass wool was weighed in additionally into the sample. The glass wool was used to retain any material that might fly up during the bake-out process and contaminate the unit.

The sample to be analyzed was baked out at 150° C. for 2 hours, and the $Al_2O_3$ standard was baked out at 350° C. for 1 hour. The following $N_2$ dosage was used for the determination, depending on the pressure range:

p/p0=0-0.01: $N_2$ dosage: 5 ml/g p/p0=0.01-0.5: $N_2$ dosage: 4 ml/g.

To determine the BET, extrapolation was performed in the range of p/p0=0.05-0.3 with at least 6 measurement points. To determine the STSA, extrapolation was performed in the range of the layer thickness of the adsorbed $N_2$ from t=0.4-0.63 nm (corresponding to p/p0=0.2-0.5) with at least 7 measurement points.

2. Determination of the Particle Size Distribution

The particle size distribution is determined by laser diffraction of the material dispersed in water (1% by weight in water) according to ISO 13320:2009. The volume fraction is specified, for example, as d99 in μm (the diameter of the grains of 99% of the volume of the sample is below this value).

3. Determination of the $^{14}C$ Content

The determination of the $^{14}C$ content (content of biologically based carbon) is carried out by means of the radiocarbon method according to DIN EN 16640:2017-08.

4. Determination of the Carbon Content

The carbon content is determined by elemental analysis according to DIN 51732:2014-7.

5. Determination of the Oxygen Content

The oxygen content is determined by high-temperature pyrolysis using the EuroEA3000 CHNS-0 analyzer of the company EuroVector S.p.A.

6. Determination of pH Value

The pH was determined following ASTM D 1512 standard as described hereinafter. The dry sample, if not already in powder form, was mortared or ground to a powder. In each case, 5 g of sample and 50 g of fully deionized water were weighed into a glass beaker. The suspension was heated to a temperature of 60° C. with constant stirring using a magnetic stirrer with heating function and stirring flea, and the temperature was maintained at 60° C. for 30 min. Subsequently, the heating function of the stirrer was deactivated so that the mixture could cool down while stirring. After cooling, the evaporated water was replenished by adding fully deionized water again and stirred again for 5 min. The pH value of the suspension was determined with a calibrated measuring instrument. The temperature of the suspension should be 23° C. (±0.5° C.). A duplicate determination was performed for each sample and the averaged value was reported.

7. Determination of the Ash Content

The water-free ash content of the samples was determined by thermogravimetric analysis in accordance with the DIN 51719 standard as follows: Before weighing, the sample was ground or mortared. Prior to ash determination, the dry substance content of the weighed-in material is determined. The sample material was weighed to the nearest 0.1 mg in a crucible. The furnace, including the sample, was heated to a target temperature of 815° C. at a heating rate of 9° K/min and then held at this temperature for 2 h. The furnace was then cooled to 300° C. before the samples were taken out. The samples were cooled to ambient temperature in the desiccator and weighed again. The remaining ash was correlated to the initial weight and thus the weight percentage of ash was determined. Triplicate determinations were performed for each sample, and the averaged value was reported 8. Determination of Solubility in Alkaline Media Determination of the alkaline solubility is carried out according to the method described hereinabove in the description.

9. Determination of the Amount of Emissions

The content of outgassable organic compounds (emissions) is determined by thermal desorption analysis according to VDA 278 (May 2016). The total outgassable organic emissions are given as the sum of the measured values from the VOG and the FOG cycle. The concentration of the single components is determined by assigning the signal peaks based on the mass spectra and retention indices. The organic emissions of the lignin particles or the stabilized lignin particles are determined on the particles themselves. The organic emissions of the rubber articles containing the lignin particles are determined on the rubber articles themselves. For the total outgassable organic emissions of the rubber articles, only the organic compounds are taken into consideration. The determined emissions consisting of inorganic constituents of the cross-linked rubber composition are not taken into consideration.

10. Determination of the Electrical Conductivity

Determination of the conductivity was carried out following the ISO 787-14 standard as follows. The dry sample, if not already in powder form, was mortared or ground to a powder. In each case, 5 g of sample and 50 g of fully deionized water were weighed into a glass beaker. The suspension was heated to a temperature of 60° C. with constant stirring using a magnetic stirrer with heating function and stirring flea, and the temperature was maintained at 60° C. for 30 min. Subsequently, the heating function of the stirrer was deactivated so that the mixture could cool down while stirring. After cooling, the evaporated water was replenished by adding fully deionized water again and stirred again for 5 min. The suspension is filtrated under negative pressure through a Büchner funnel by using filter paper with 3-5 μm. In the process, a suction flask must be used to collect the filtrate water. The conductivity of the filtrate water is determined with a calibrated conductivity meter. The temperature should be 23° C. (±0.5° C.). The conductivity of the filtrate water is to be specified in [$\mu Scm^{-1}$].

11. Determination of the Glass Transition Temperature

Measurement of the glass transition temperature is carried out according to DIN 53765.

12. Determination of the Solubility in Ethanol

To determine the solubility of a solid sample in ethanol, a sample with a content of dry substance of >98% is employed. If this is not the case, the sample is first ground or thoroughly mortared and dried on the moisture balance or in the drying cabinet before the determination. When drying in the drying cabinet, the dry substance content must also be determined, since it has to be taken into consideration in the calculation of the solubility. The cellulose tube is filled to approx. ⅔ with the sample quantity or at least 3 g, whereby the weighing-in must be carried out on the analytical balance with 0.1 mg accuracy. The sample is then extracted under reflux with 250 mL ethanol-water mixture (1:1 weight ratio) using boiling stones until the reflux is almost colorless (about 24 h). The tube is dried, in the fume hood (1 h) first and then in the drying oven for 24 h, until the weight remains constant and then weighed. The solubility in ethanol can then be calculated as follows:

$$\text{Solubility in ethanol of lignin-rich solid matter [\%]} = \text{mass of the undissolved proportion after centrifugation, filtration and drying [g]} > 100/\text{weighed-in amount [g]}$$

13. Determination of the Solubility in Dimethylformamide

The solubility in dimethylformamide (DMF) is determined by triplicate determination. First, 1× filter paper, Ø=55 mm, with a suitable Büchner funnel (BT) is respectively dried in preparation, and the respective empty weight (accurate to 0.1 mg) is documented in the solubility protocol. 2 g of dry sample each are weighed into 40 g DMF in an Erlenmeyer flask with 100 ml. The suspension is kept in motion on an overhead rotator at medium speed for 2 hours and then centrifuged for 15 min. The decanted supernatant is filtered through the prepared Büchner funnel after humidification of the filter paper. After complete filtration, the pH value of the filtrate has to be checked and noted. This is followed by two washing cycles with approximately 30 ml of deionized water each, followed by centrifugation and filtration of the supernatant through the Buchner funnel to purify the filter cake from soluble DMF. Finally, the centrifuge tubes & Büchner funnel including the filter paper are dried in the drying cabinet for 24 h. The solubility in DMF can then be calculated as follows:

$$\text{Solubility of the lignin-rich solid matter in } DMF \text{ [\%]} = \text{mass of the undissolved proportion after centrifugation, filtration and drying [g]} * 100/\text{weighed-in amount [g]}$$

14. Determination of the Content of Syringyl Building Blocks

The content of syringyl building blocks was determined by means of pyrolysis-GC/MS. Approximately 300 μg of the sample was pyrolyzed at 450° C. using an EGA/Py 3030D pyrolysis furnace (Frontier Lab). Separation of the components was carried out using a GC 7890D gas chromatograph (Agilent technologies) on a ZB-5 MS column (30 m×0.25 mm) with a temperature program from 50° C. to 240° C. with a heating rate of 4° K/min, and further heating to 300° C. with a heating rate of 39° K/min with a holding time of 15 min. The substance was assigned using the mass spectral libraries 5977 MSD (SIM) and NIST 2014.

In the following, the present invention will be explained in more detail with reference to exemplary embodiments.

Exemplary Embodiments

In the following examples, BET is given instead of STSA. BET and STSA do however not differ from one another by more than 10% for the stabilized lignin particles produced herein.

Example 1—Stabilization by Heat Treatment in Step D)

The raw material for this example is LignoBoost lignin (BioPiva) recovered from a black liquor from Kraft pulping. The solid matter is first suspended in distilled water. The pH value is adjusted to about 10 by adding solid sodium hydroxide. Further, the addition of water is selected in a way that a defined dry matter content is achieved. To produce the lignin dissolved in a liquid, the mixture is stirred at a temperature for a defined time, taking care to balance any evaporated water by addition.

| Name of experiment | Amount of lignin [g] | Amount and type of solution additive | Amount and type of liquid | Temperature [° C.] | Time [min] |
|---|---|---|---|---|---|
| Solution 1 | 100 | 9 g/NaOH | 420.3 g/ distilled water | 80 | 180 |
| Solution 2 | 200 | 18 g/NaOH | 944 g/ distilled water | 80 | 180 |
| Solution 1 | 1000 | 90 g/NaOH | 4000 g/ distilled water | 80 | 180 |
| Solution 4 | 381 | 27 g/NaOH | 1500 g/ distilled water | 80 | 180 |

The employed lignin has 1.15 mmol/g of phenolic guaiacyl groups and 0.05 mmol/g of p-hydroxyphenyl groups, hence 1.25 mmol/g of cross-linkable units.

The lignin dissolved in the liquid is now brought to react with a cross-linking agent in the first process stage. The formaldehyde employed as the cross-linking agent for modification of the lignin has 66.6 mmol of cross-linkable units/g of dry formaldehyde. The reaction takes place in a glass bulb. The cross-linking agent is added and a stirrer provides the necessary mixing. Heat is supplied by a water bath. After a temperature of 5° C. below reaction temperature has been passed, the holding time begins. After the holding time has elapsed, the water bath is removed and the reaction solution is stirred for another hour.

| Name of experiment | Lignin-containing raw material | Amount of cross-linking agent [g] | Type of cross-linking agent | Temperature [° C.] | Time [min] |
|---|---|---|---|---|---|
| PS1 Modification 1 | Solution 1 | 6.2 | Formaldehyde | 95 | 180 |
| PS1 Modification 2 | Solution 2 | 12.6 | Formaldehyde | 95 | 240 |
| PS1 Modification 3* | 600 g Solution 3 | — | — | 95 | 240 |
| PS1 Modification 4 | 1000 g Solution 4 | 12.6 | Formaldehyde | 95 | 240 |

*not according to the invention

The mixture produced in the first process stage is then transferred to the second process stage.

In the second process stage, the production of the particles in the presence of a liquid and the addition of the precipitating agent and the precipitation additive is carried out first.

| Name of experiment | Mixture comprising dissolved, modified lignin from the first state | Amount and type of liquid | Amount and type of precipitation additive | Amount and type of precipitating agent | Temperature [° C.] |
|---|---|---|---|---|---|
| PS1 Particle formation 1 | 50 g PS1 Modification 1 | 50 g water | 100 g acetone | 120 ml 0.05M $H_2SO_4$ | 20-25 |

-continued

| Name of experiment | Mixture comprising dissolved, modified lignin from the first state | Amount and type of liquid | Amount and type of precip-itation additive | Amount and type of precipitating agent | Temper-ature [° C.] |
|---|---|---|---|---|---|
| PS1 Particle formation 2 | 1100 g PS1 Modification 2 | 1100 g water | 2214 g acetone | 3400 ml 0.05M $H_2SO_4$ | 20-25 |
| PS1 Particle formation 3* | 600 g PS1 Modification 3 | | 300 g acetone | 900 ml 0.1M $H_2SO_4$ | 20-25 |
| PS1 Particle formation 4 | 1019 g PS1 Modification 4 | 1004 g water | 2011 g acetone | 1380 ml 0.1M $H_2SO_4$; 300 ml 0.05M $H_2SO_4$ | 20-25 |

*not according to the invention

The separation of the liquid from the particles is carried out by centrifugation first. Then, the particles still moist after centrifugation are dried.

PS2 Water Separation 3 took place only thermally.

| Name of experiment | Particles from | Drying temperature [° C.] |
|---|---|---|
| PS2 Water Separation 1 | PS2 Particle Formation 1 | 105 |
| PS2 Water Separation 2 | PS2 Particle Formation 2 | 105 |
| PS2 Water Separation 3* | PS2 Particle Formation 3 | 105 |
| PS2 Water Separation 4 | PS2 Particle Formation 4 | 105 |
| PS2 Water Separation 5* | PS2 Particle Formation 4 | max. 40 |

*not according to the invention

Finally, heating of the particles for stabilization is carried out (heat treatment). In the case of PS2 Water Separation 5 (comparative example), no further heat treatment than the drying at 40° C. carried out above as described was conducted.

| Name of experiment | Particles from | Temper-ature [° C.] | Duration [min] | Pressure [mbar] |
|---|---|---|---|---|
| PS2 Heating 1 | PS2 Water Separation 1 | 105 | min. 960 | 1000 |
| PS2 Heating 2 | PS2 Water Separation 2 | 105 | min. 960 | 1000 |
| PS2 Heating 3 | PS2 Heating 2 | 200 | 45 | 200 |
| PS2 Heating 4 | PS2 Heating 2 | 210 | 120 | 200 |
| PS2 Heating 5* | PS2 Water Separation 3 | 105 | min. 960 | 1000 |
| PS2 Heating 6 | PS2 Water Separation 4 | 105 | min. 960 | 1000 |
| PS2 Heating 7 | PS2 Heating 6 | 210 | 180 | 100 |

*not according to the invention

The material obtained in PS2 Heating 2 was ground in order to investigate the effect of the Heating 4 on the particle size distribution.

The obtained particles were subsequently analyzed:

| Material from experiment | BET [$m^2$/g] | Solubility [%] | Yield [%] | Further analytics |
|---|---|---|---|---|
| PS2 Heating 1 | 33 | 7.0 (0.2M NaOH) | 72 | REM |
| PS2 Heating 2 | 10 | 21.8 (0.1M NaOH) | 79 | PSD, REM, Tg |
| PS2 Heating 3 | 9 | 3.0 (0.1M NaOH) | | |
| PS2 Heating 4 | 9 | 0.2 (0.1M NaOH) | | PSD, REM |
| PS2 Heating 5* | 56 | 99.8 (0.1M NaOH) | 100 | |
| PS2 Heating 6 | 3 | 6.0 (0.1M NaOH) | 59 | 13C-NMR |
| PS2 Heating 7 | 3 | 0 (0.1M NaOH) | | |
| PS2 Water Separation 5* | n.d. | 97.6 (0.1M NaOH) | 59 | 13C-NMR |

*not according to the invention;
n.d. = not determined

The curve of the heat flow measured by DSC shows no inflection point between different levels. A glass transition temperature cannot be determined. For example, FIG. 1 represents a DSC curve, as determined by differential thermal analysis, of the stabilized lignin from PS2 Heating 2 that does not show any glass transition temperature up to 200° C.

In 13C-NMR, the modification and the cross-linking of the lignin can be traced. The peak at 60 ppm for the newly introduced hydroxymethyl group can be seen in the spectra with functionalized lignin as a shoulder of the strong peak of the methoxy groups at 56 ppm. The modified and stabilized lignin shows significantly less guaiacyl C-5 and p-hydroxyphenyl C-3 and C-5 in the region around 115 ppm. The cross-linking can be made clear by means of the differences of the spectra of PS2 Water Separation 5 and PS2 Heating 6. In addition to a decrease in the hydroxymethyl groups at 60 ppm, the heating of the particles also resulted in a shift in the intensity of the signal in the region around 115 ppm to more intensity at the signal in the region around 127 ppm, that is, a conversion of the C—H-groups in the guaiacyl C-5 as well as p-hydroxyphenyl C-3 and C-5 to C—C. Most prominent is a peak at 30 ppm, which is caused by the carbon atom of the newly formed methylene bridges between the aromatic compounds.

Figure 1:
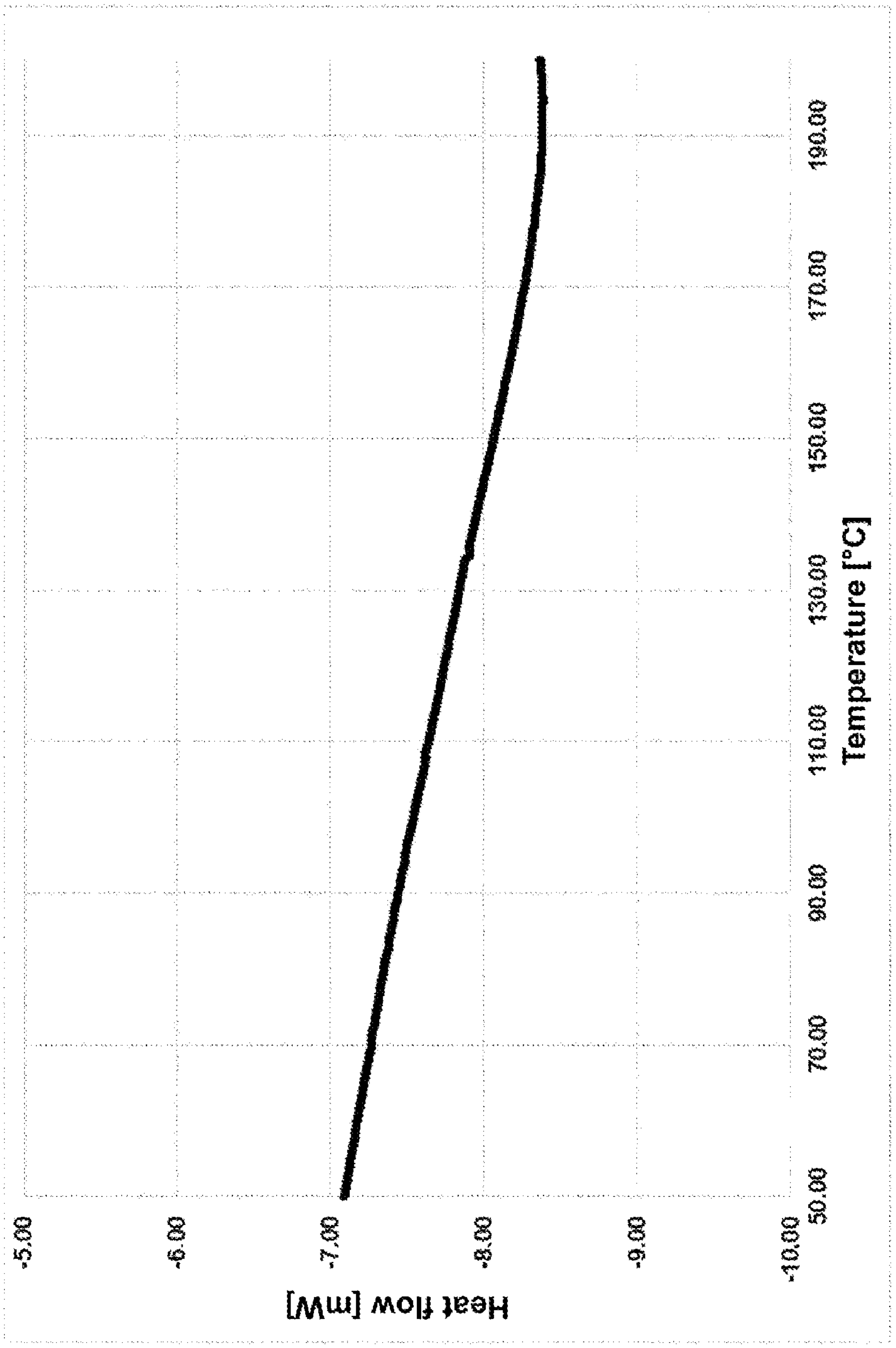
Figure 2:
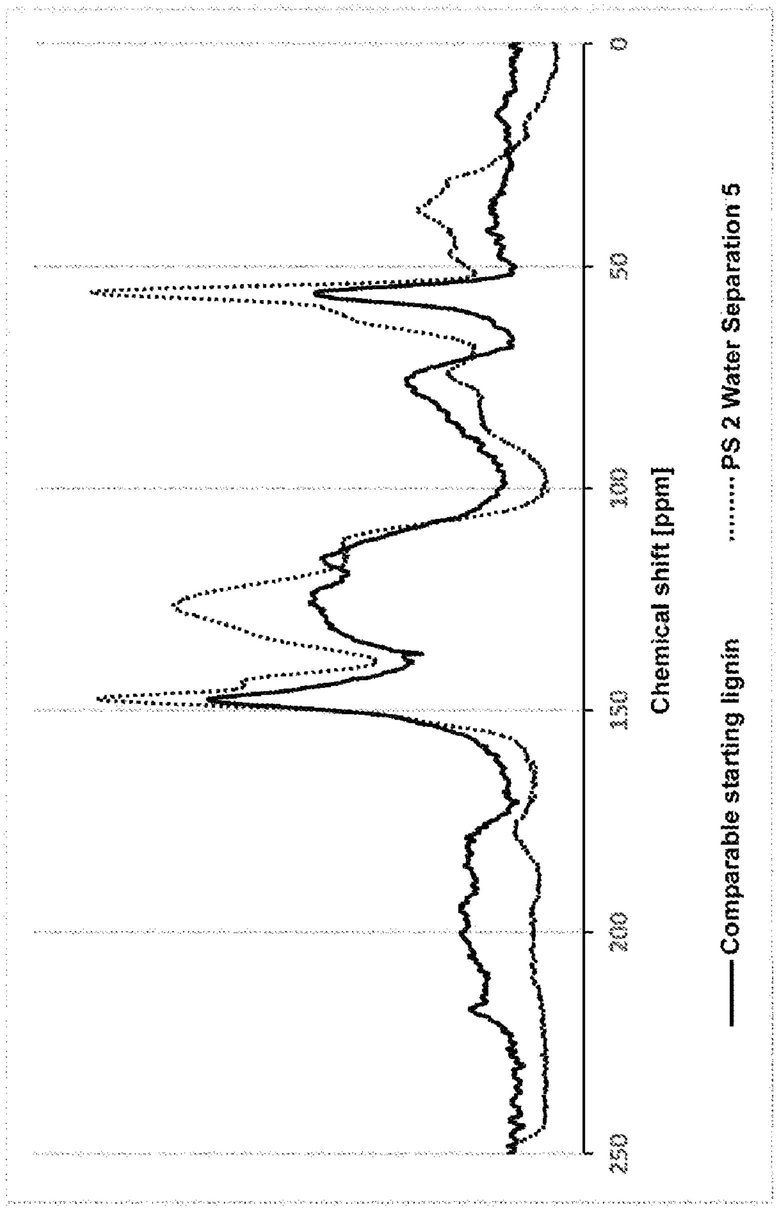
FIG. 2 shows 13C-NMR spectra of lignin-containing raw material (solid line) and modified lignin (PS2 Water Separation 5, dotted line).
Figure 3:
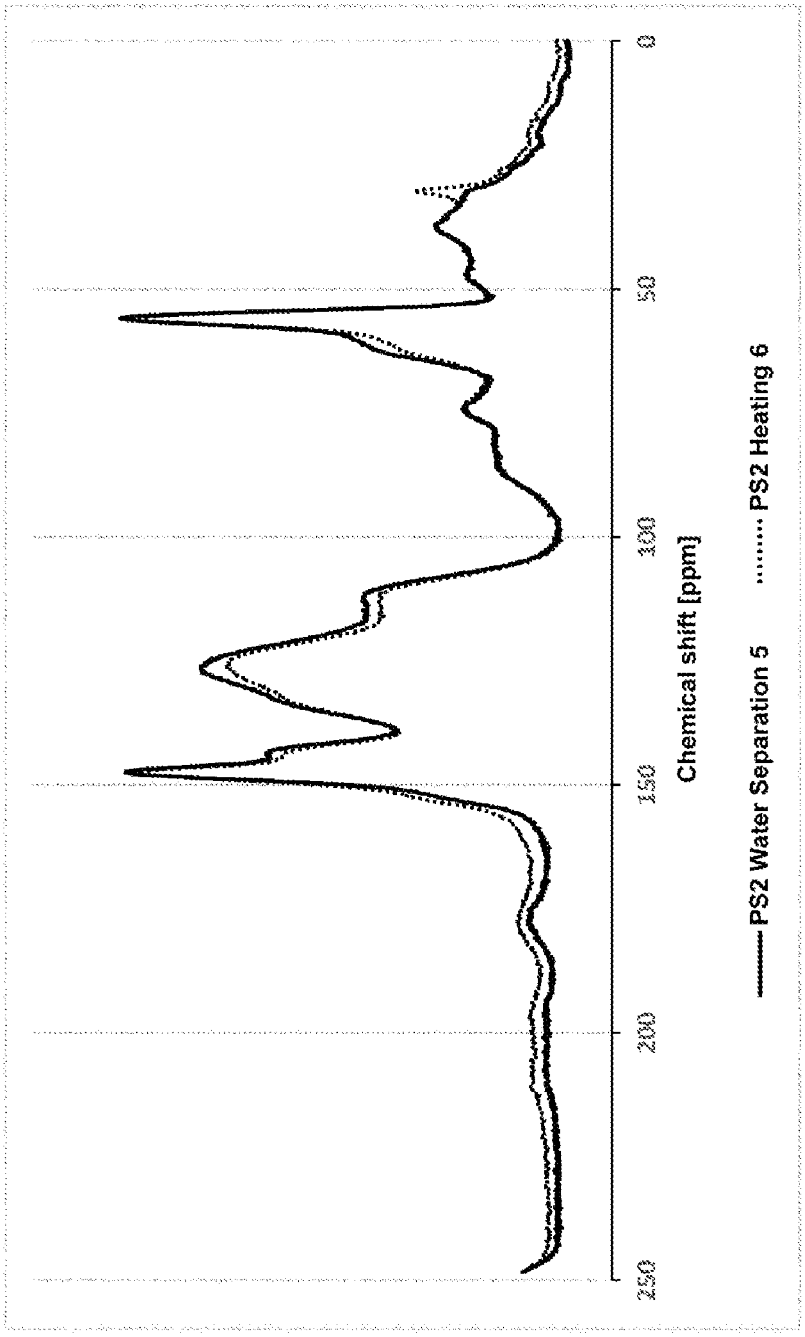
FIG. 3 shows 13C-NMR spectra of modified lignin (PS2 Water Separation 5, solid line) and stabilized lignin (PS2 Heating 6, dotted line)
Figure 4:
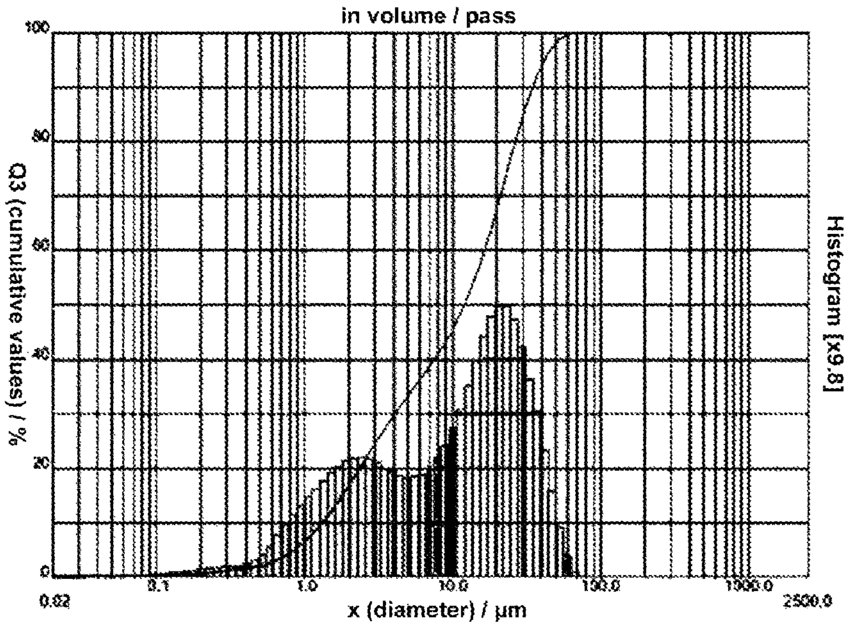
Figure 4:
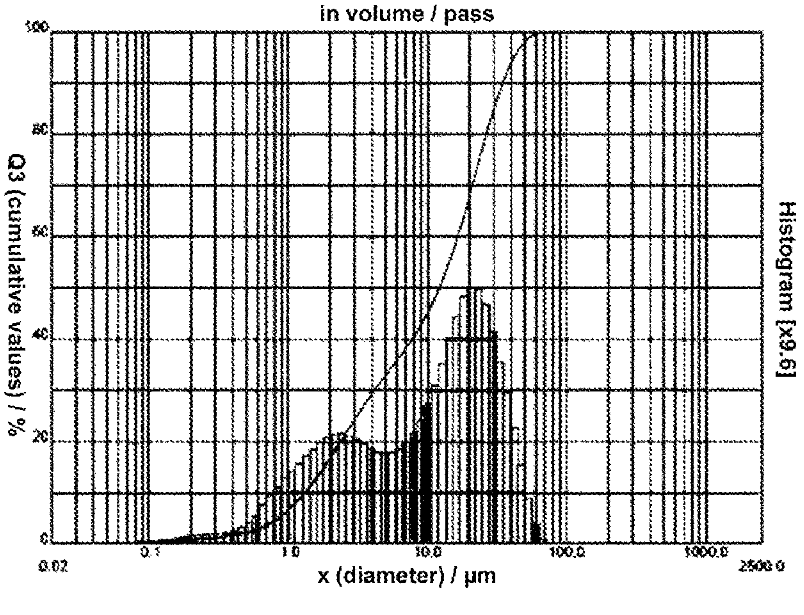

FIG. 4 shows the measurement of the particle size distribution PSD of PS2 Heating 2 (top, d50=12.0 μm) and PS2 Heating 4 (bottom, d50=12.2 μm).

The particle size measurements of PS2 Heating 2 and PS2 Heating 4 demonstrate the stability of the particles (FIG. 4). After baking out for two hours at 210° C., i.e., above the common glass transition temperature for lignin, the particles are not sintered. The particle size distribution has been preserved. At the same time, the solubility of PS2 Heating 2 and PS2 Heating 4 shows that it can be controlled by way of the heating of the particles.

The sample PS2 Heating 5, without the addition of cross-linking agent, serves as the reference sample and shows a significantly higher alkaline solubility. In the same way, the sample PS2 Water Separation 5 shows that a drying in the sense of a heat treatment at only 40° C. is not sufficient, since this sample also exhibits a very high alkaline solubility.

Figure 5:
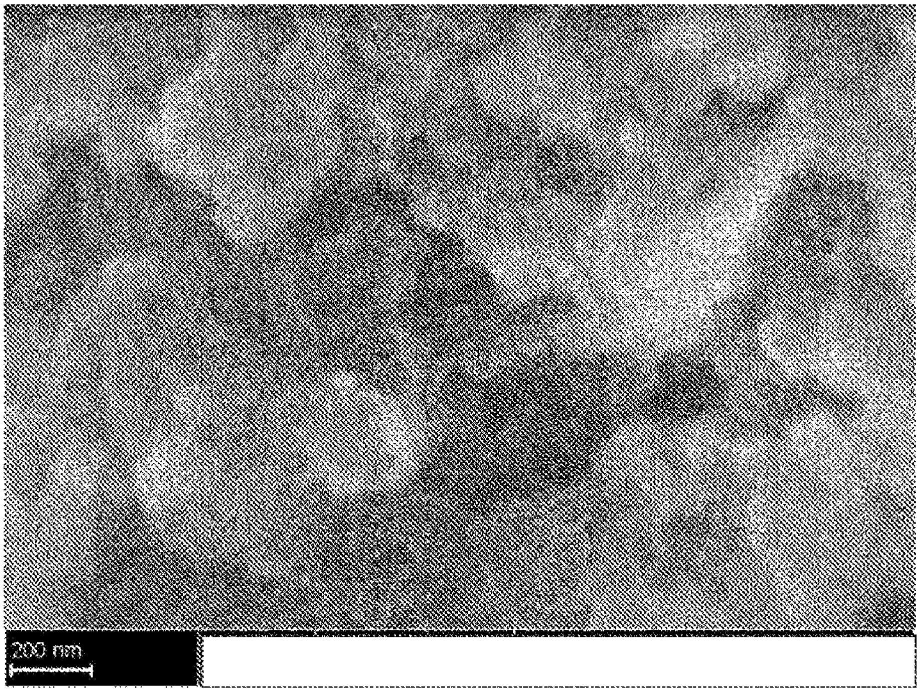

FIG. 5 shows a photograph by means of scanning electron microscopy of the particles of PS2 Heating 1, in which the high surface area is also evident from the fine particulate structure. The measurement parameters of the photograph are: HV 11.00 KV, WD 10.0 mm, InLens, Mag 50.00 K X, B1=20.00 μm, 2 56.6 s Drift Comp. Frame Avg.

Example 2—Stabilization by Heat Treatment after Precipitation within Step b)

The raw material for this example is LignoBoost lignin (BioPiva) recovered from a black liquor from Kraft pulping.

The solid matter is first suspended in distilled water. The pH value is adjusted to about 10 by adding solid sodium hydroxide. Further, the addition of water is selected in a way that a defined dry matter content is achieved. To produce the lignin dissolved in a liquid, the mixture is stirred at a temperature for a defined time, taking care to balance any evaporated water by addition.

| Name of experiment | Amount of lignin [g] | Amount and type of solution additive | Amount and type of liquid | Temperature [° C.] | Time [min] |
|---|---|---|---|---|---|
| Solution 5 | 1364.74 | 121.5 g/ NaOH | 7635.36 g/ distilled water | 80 | 180 |

The employed lignin has 1.15 mmol/g of phenolic guaiacyl groups and 0.05 mmol/g of p-hydroxyphenyl groups, hence 1.25 mmol/g of cross-linkable units.

The lignin dissolved in the liquid is now brought to react with a cross-linking agent in the first process stage. The formaldehyde employed as the cross-linking agent for modification of the lignin has 66.6 mmol of cross-linkable units/g of dry formaldehyde. The reaction takes place in a glass bulb. The cross-linking agent is added and a stirrer provides the necessary mixing. Heat is supplied by a water bath. After a temperature of 5° C. below reaction temperature has been passed, the holding time begins. After the holding time has elapsed, the water bath is removed and the reaction solution is stirred for another hour.

| Name of Experiment | Lignin-containing raw material | Amount of cross-linking agent [g] | Type of cross-linking agent | Temperature [° C.] | Time [min] |
|---|---|---|---|---|---|
| PS1 Modification 5 | 200 g solution 5 | 7.8 | Formaldehyde | 80 | 180 |
| PS1 Modification 6 | 200 g solution 5 | 7.8 | Formaldehyde | 80 | 180 |
| PS1 Modification 7 | 200 g solution 5 | 7.8 | Formaldehyde | 80 | 180 |
| PS1 Modification 8 | 200 g solution 5 | 7.8 | Formaldehyde | 80 | 180 |
| PS1 Modification 9 | 200 g solution 5 | 7.8 | Formaldehyde | 80 | 180 |
| PS1 Modification 10 | 200 g solution 5 | 7.8 | Formaldehyde | 80 | 180 |
| PS1 Modification 11 | 200 g solution 5 | 7.8 | Formaldehyde | 80 | 180 |
| PS1 Modification 12 | 800 g Solution 5 | 31.1 | Formaldehyde | 80 | 180 |
| PS1 Modification 13 | 800 g Solution 5 | 31.1 | Formaldehyde | 80 | 180 |
| PS1 Modification 14 | 200 g solution 5 | 7.8 | Formaldehyde | 80 | 180 |
| PS1 Modification 15 | 800 g Solution 5 | 31.1 | Formaldehyde | 80 | 180 |

The mixture produced in the first process stage is then transferred to the second process stage.

In the second process stage, the production of the particles by addition of the precipitating agent (no addition of precipitation additive) is carried out first.

| Name of Experiment | Mixture comprising dissolved, modified lignin from the first state | Amount and type of precipitating agent | Temperature [° C.] |
|---|---|---|---|
| PS2 Particle Formation 5 | 207.8 g PS1 Modification 5 | 200 g 0.2M $H_2SO_4$ | 20-25 |

-continued

| Name of Experiment | Mixture comprising dissolved, modified lignin from the first state | Amount and type of precipitating agent | Temperature [° C.] |
|---|---|---|---|
| PS2 Particle Formation 6 | 207.8 g PS1 Modification 6 | 200 g 0.2M $H_2SO_4$ | 20-25 |
| PS2 Particle Formation 7 | 207.8 g PS1 Modification 7 | 200 g 0.1M $H_2SO_4$ | 20-25 |
| PS2 Particle Formation 8 | 207.8 g PS1 Modification 8 | 200 g 0.1M $H_2SO_4$ | 20-25 |
| PS2 Particle Formation 9 | 207.8 g PS1 Modification 9 | 200 g 0.1M $H_2SO_4$ | 20-25 |
| PS2 Particle Formation 10 | 207.8 g PS1 Modification 10 | 200 g 0.1M $H_2SO_4$ | 20-25 |
| PS2 Particle Formation 11 | 207.8 g PS1 Modification 11 | 200 g 0.1M $H_2SO_4$ | 20-25 |
| PS2 Particle Formation 12 | 415.6 g PS1 Modification 12 | 400 g 0.1M $H_2SO_4$ | 20-25 |
| PS2 Particle Formation 13 | 415.6 g PS1 Modification 13 | 400 g 0.1M $H_2SO_4$ | 20-25 |
| PS2 Particle Formation 14 | 207.8 g PS1 Modification 14 | 200 g 0.1M $H_2SO_4$ | 20-25 |
| PS2 Particle Formation 15 | 415.6 g PS1 Modification 15 | 400 g 0.1M $H_2SO_4$ | 20-25 |

Stabilization of the particles was carried out within the second process stage by a heat treatment after the precipitation carried out within step b).

| Name of Experiment rel. to heat treatment within step b) | Lignin particles from | Temperature [° C.] | Duration [min] |
|---|---|---|---|
| PS2 Heat Treatment 1 | PS2 Particle Formation 5 | 95 | 180 |
| PS2 no HT* | PS2 Particle Formation 6 | — | — |
| PS2 Heat Treatment 2 | PS2 Particle Formation 7 | 95 | 180 |
| PS2 Heat Treatment 3 | PS2 Particle Formation 8 | 110 | 180 |
| PS2 Heat Treatment 4 | PS2 Particle Formation 9 | 130 | 180 |
| PS2 Heat Treatment 5 | PS2 Particle Formation 10 | 150 | 180 |
| PS2 no HT* | PS2 Particle Formation 11 | — | — |
| PS2 Heat Treatment 6 | PS2 Particle Formation 12 | 95 | 180 |
| PS2 Heat Treatment 7 | PS2 Particle Formation 13 | 110 | 180 |
| PS2 Heat Treatment 8 | PS2 Particle Formation 12 | 130 | 180 |
| PS2 Heat Treatment 9 | PS2 Particle Formation 14 | 150 | 180 |
| PS2 no HT* | PS2 Particle Formation 15 | — | — |
| PS2 Heat Treatment 10 | PS2 Particle Formation 12 | 95 | 180 |
| PS2 Heat Treatment 11 | PS2 Particle Formation 13 | 110 | 180 |
| PS2 Heat Treatment 12 | PS2 Particle Formation 12 | 130 | 180 |
| PS2 Heat Treatment 13 | PS2 Particle Formation 14 | 150 | 180 |
| PS2 no HT* | PS2 Particle Formation 15 | — | — |

*not according to the invention;
HT = heat treatment

The separation of the liquid from the particles is carried out by filtration first. Then, the particles still moist after filtration are dried.

| Name of Experiment | Particles from | Drying Temperature [° C.] | Duration [min] | Pressure [mbar] |
|---|---|---|---|---|
| PS2 Water Separation 6 | PS2 Heat Treatment 1 | 105 | 48 | 1000 |
| PS2 Water Separation 7* | PS2 Particle Formation 6 | 105 | 48 | 1000 |
| PS2 Water Separation 8 | PS2 Heat Treatment 2 | 105 | 48 | 1000 |
| PS2 Separation 9 | PS2 Heat Treatment 3 | 105 | 48 | 1000 |

-continued

| Name of Experiment | Particles from | Drying Temperature [° C.] | Duration [min] | Pressure [mbar] |
|---|---|---|---|---|
| PS2 Water Separation 10 | PS2 Heat Treatment 4 | 105 | 48 | 1000 |
| PS2 Water Separation 11 | PS2 Heat Treatment 5 | 105 | 48 | 1000 |
| PS2 Water Separation 12* | PS2 Particle Formation 11 | 105 | 48 | 1000 |
| PS2 Water Separation 13 | PS2 Heat Treatment 6 | 40 | 48 | 100 |
| PS2 Water Separation 14 | PS2 Heat Treatment 7 | 40 | 48 | 100 |
| PS2 Water Separation 15 | PS2 Heat Treatment 8 | 40 | 48 | 100 |
| PS2 Water Separation 16 | PS2 Heat Treatment 9 | 40 | 48 | 100 |
| PS2 Water Separation 17* | PS2 Particle Formation 15 | 40 | 48 | 100 |
| PS2 Water Separation 18 | PS2 Heat Treatment 10 | 150 | 48 | 1000 |
| PS2 Water Separation 19 | PS2 Heat Treatment 11 | 150 | 48 | 1000 |
| PS2 Water Separation 20 | PS2 Heat Treatment 12 | 150 | 48 | 1000 |
| PS2 Water Separation 21 | PS2 Heat Treatment 13 | 150 | 48 | 1000 |
| PS2 Water Separation 22 | PS2 Particle Formation 15 | 150 | 48 | 1000 |

*not according to the invention

The obtained particles were subsequently analyzed:

| Material from Experiment | BET [$m^2/g$] | Solubility [%] | Yield [%] | Further Analytics |
|---|---|---|---|---|
| PS2 Water Separation 6 | 15.0 | 3.8 (0.1M NaOH) | n.d. | PSD, pH/LFK, Tg, solubility EtOH, VDA278 |
| PS2 Water Separation 7* | 0.3 | 5.9 (0.1M NaOH) | n.d. | |
| PS2 Water Separation 8 | 66.9 | 5.3 (0.1M NaOH) | 76.4 | PSD, Tg, solubility EtOH, VDA278, 13C-ss-NMR |
| PS2 Water Separation 9 | 78.3 | 2.9 (0.1M NaOH) | 77.7 | PSD, pH/LFK, Tg, solubility DMF, VDA278 |
| PS2 Water Separation 10 | 81.2 | 1.7 (0.1M NaOH) | n.d. | PSD, 13C-ss-NMR, pH/LFK, Py-GC/MS, Tg |
| PS2 Water Separation 11 | 65.0 | 4.6 (0.1M NaOH) | 79.3 | PSD, Tg, solubility DMF, VDA278 |
| PS2 Water Separation 12* | 0.7 | 12.2 (0.1M NaOH) | 87.3 | PSD |
| PS2 Water Separation 13 | 46.4 | 8.7 (0.1M NaOH) | 77.5 | |
| PS2 Water Separation 14 | 60.2 | 6.7 (0.1M NaOH) | n.d. | Tg |
| PS2 Water Separation 15 | 82.1 | 5.6 (0.1M NaOH) | n.d. | PSD, 13C-ss-NMR, pH/LFK, Py-GC/MS, Tg |
| PS2 Water Separation 16 | 76.0 | 4.8 (0.1M NaOH) | 75.6 | Tg |
| PS2 Water Separation 17* | 0.5 | 86.8 (0.1M NaOH) | 86.7 | PSD |
| PS2 Water Separation 18 | 18.0 | 0.0 (0.1M NaOH) | 70.3 | Tg |
| PS2 Water Separation 19 | 18.4 | 0.9 (0.1M NaOH) | 68.8 | PSD, Tg |
| PS2 Water Separation 20 | 32.0 | 0.4 (0.1M NaOH) | 74.7 | PSD, 13C-ss-NMR, Py-GC/MS |
| PS2 Water Separation 21 | 53.2 | 1.9 (0.1M NaOH) | 89.4 | Tg |

-continued

| Material from Experiment | BET [$m^2/g$] | Solubility [%] | Yield [%] | Further Analytics |
|---|---|---|---|---|
| PS2 Water Separation 22* | 0.1 | 0.0 (0.1M NaOH) | 78.9 | |

*not according to the invention;
n.d. = not determined

Figure 6:
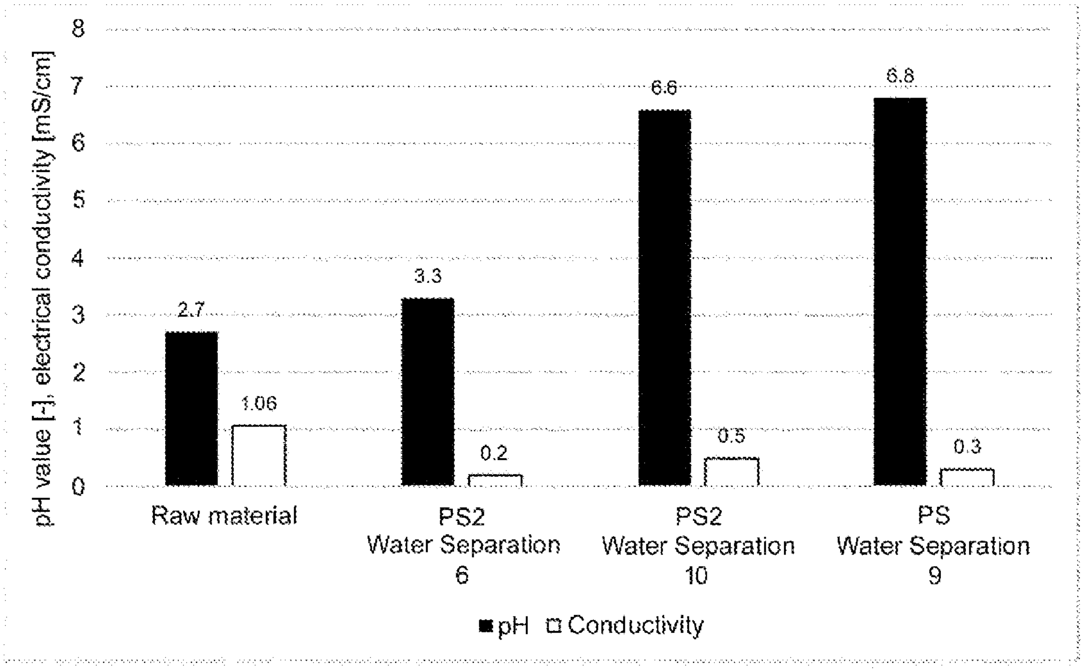

FIG. 6 shows the pH value and the electrical conductivity of the lignin-containing raw material, PS2 Water Separation 6, PS2 Water Separation 9 and PS Water Separation 10. As compared to the lignin-containing raw material, the particles, stabilized in step b) after precipitation, exhibit lower conductivity and, depending on the precipitating agent used, a higher pH value.

Figure 7:
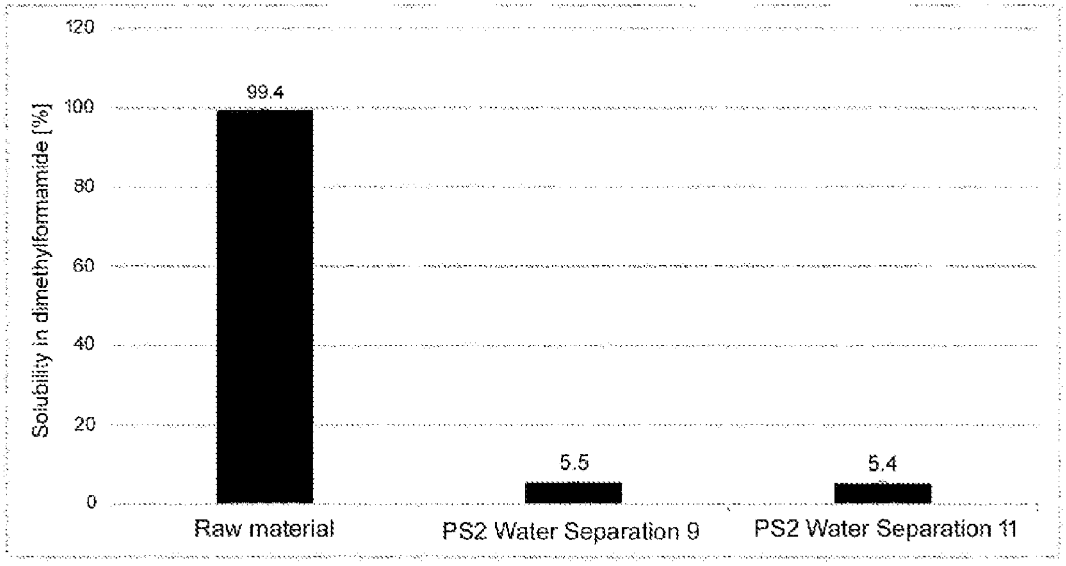

FIG. 7 shows the solubility of lignin-containing raw material, PS2 Water Separation 9 and PS2 Water Separation 11 in dimethylformamide.

Figure 8:
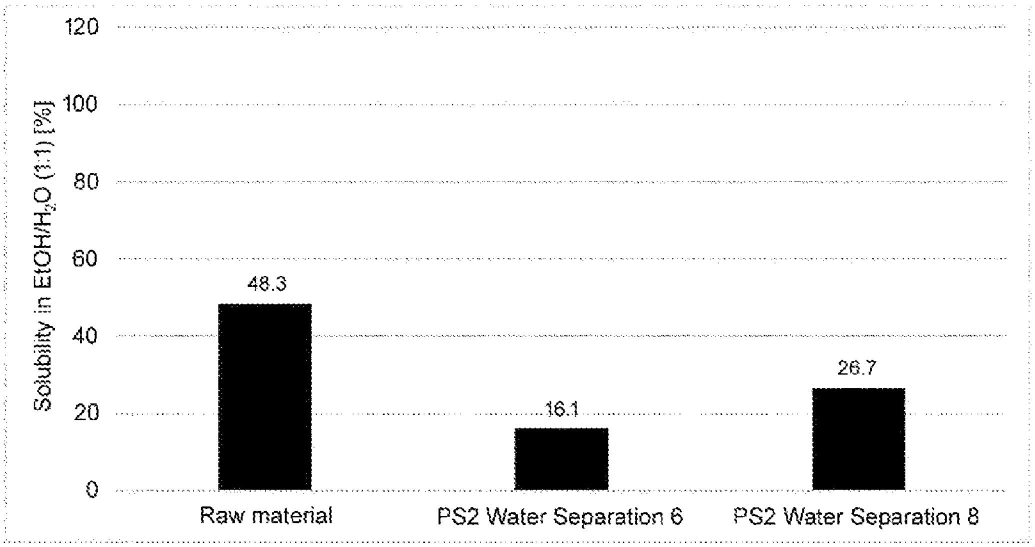

FIG. 8 shows the solubility of lignin-containing raw material, PS2 Water Separation 6 and PS2 Water Separation 8 in a mixture of ethanol and water (1:1).

The results illustrate that the stabilization of the particles in step b) after precipitation leads to a significant decrease of the solubility in polar solvents, compared to the lignin-containing raw material.

Figure 9:
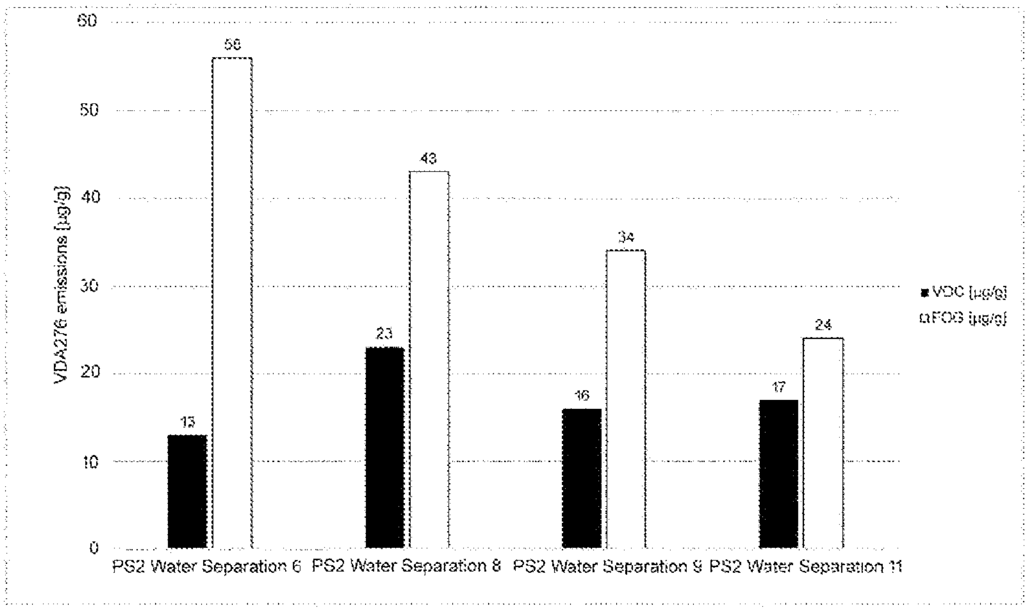

FIG. 9 shows the emissions according to VDA278 of PS2 Water Separation 6, PS2 Water Separation 8, PS2 Water Separation 9 and PS2 Water Separation 11.

Particles that were stabilized in step b) after precipitation can be characterized by low emissions according to VDA278. The level of the emissions is affected by the temperature during stabilization of the particles in step b) after precipitation. With increasing stabilizing temperature, the emissions according to VDA278 are decreased.

Figure 10:
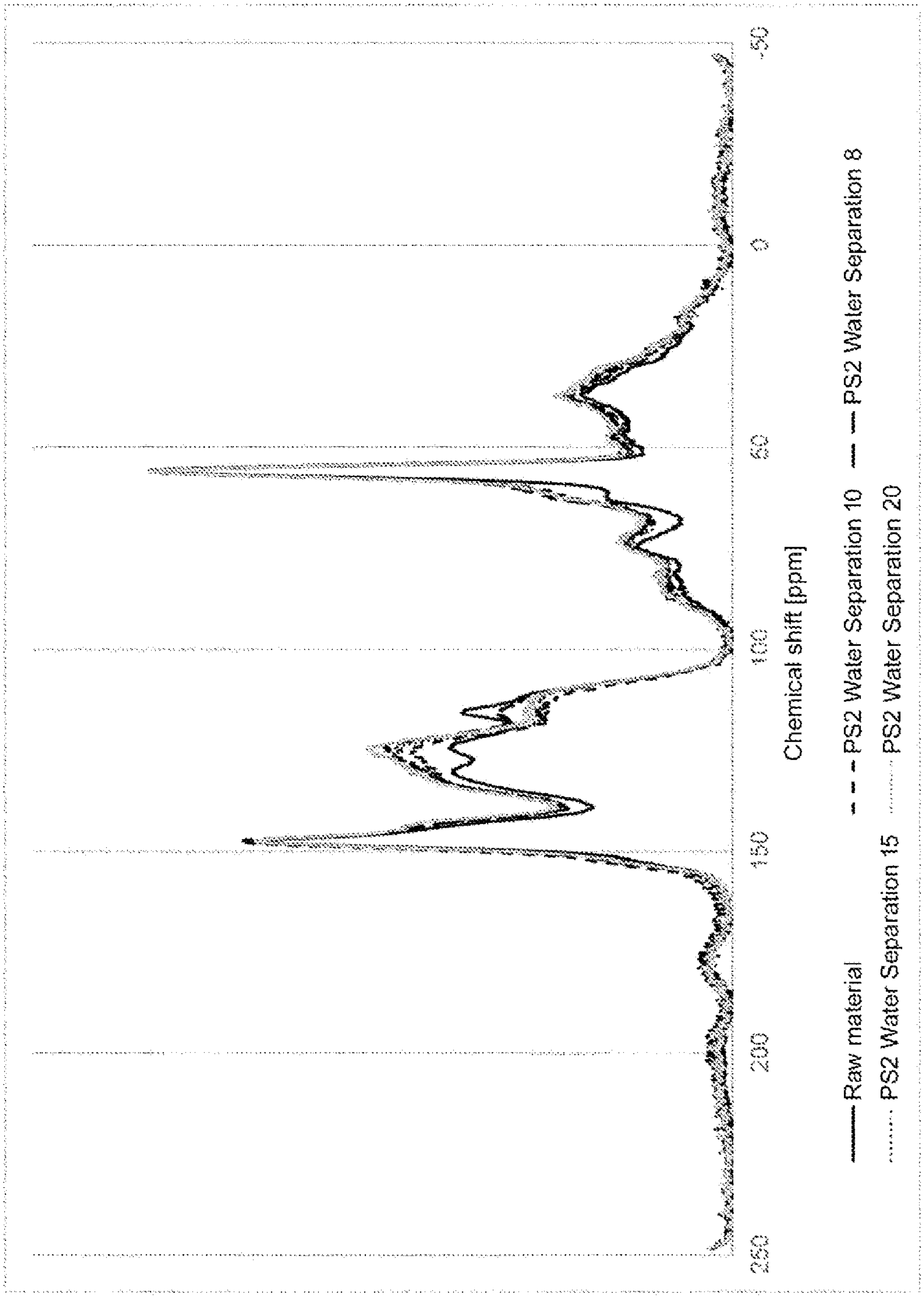

FIG. 10 shows 13C-NMR spectra of lignin-containing raw material (black solid line) and lignins stabilized in stage b) (PS2 Water Separation 10, PS2 Water Separation 8, PS2 Water Separation 15, PS2 Water Separation 20, grey solid line and black dotted line).

In analogy to the stabilization of the particles in step d), the modification and the cross-linking of the lignin can be traced in the 13C-NMR in the case of stabilization of the particles in step b) after precipitation, too. The peak at 60 ppm for the newly introduced hydroxymethyl group can be seen in the spectra with functionalized lignin as a shoulder of the strong peak of the methoxy groups at 56 ppm. The modified and stabilized lignin shows significantly less guaiacyl C-5 and p-hydroxyphenyl C-3 and C-5 in the region around 115 ppm. Compared to the stabilization in step d), the peak at 30 ppm, which is caused by the carbon atom of the newly formed methylene bridges between the aromatic compounds, is expressed only as a shoulder in the case of stabilization of the particles in step b) after precipitation.

Figure 11:
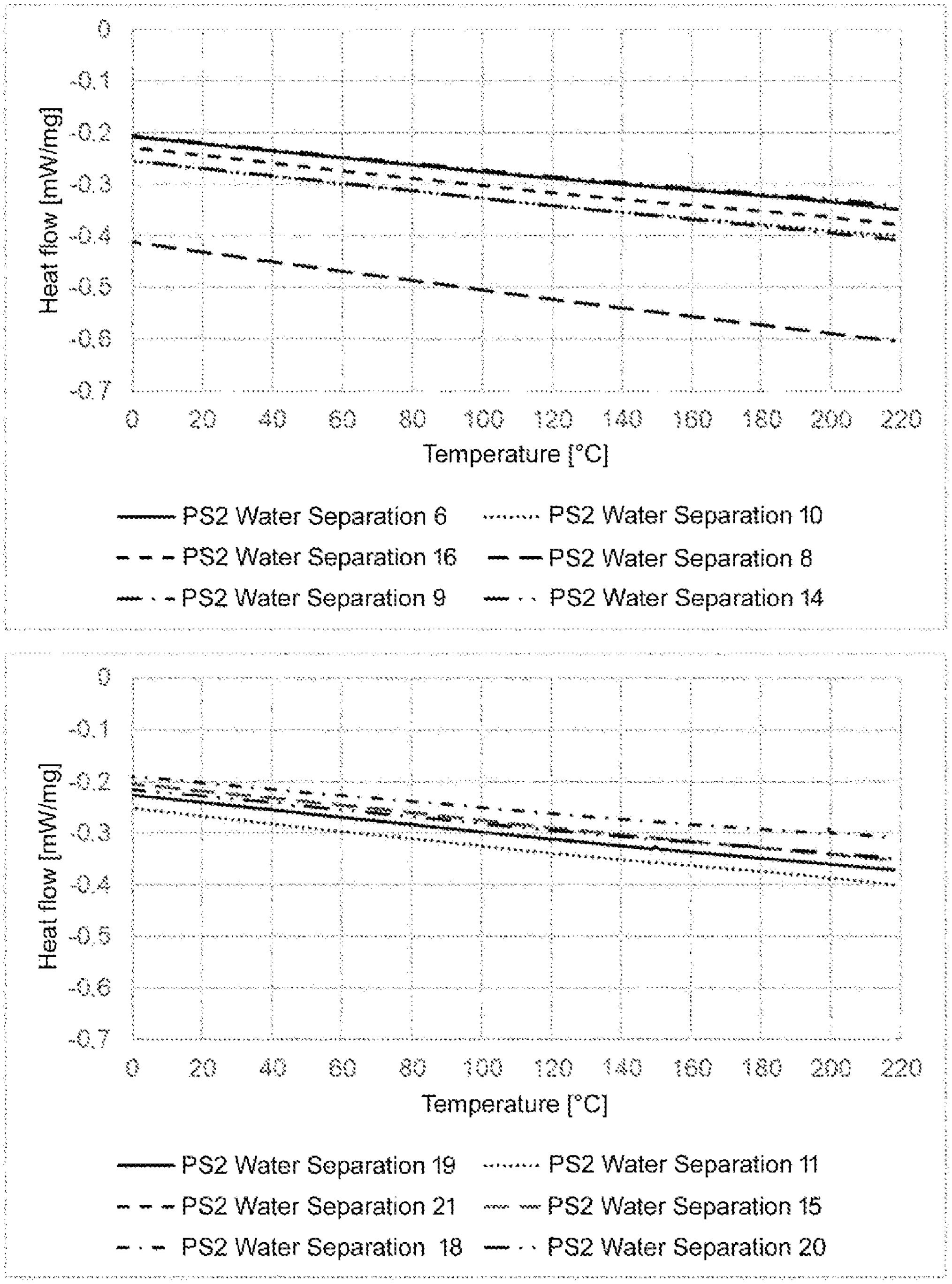

FIG. 11 shows the course of the heat flow, measured by DSC, of the particles that were stabilized in step b) after the precipitation. An inflection point between different levels cannot be detected. A glass transition temperature cannot be determined. FIG. 11 represents the DSC curves, as determined by differential thermal analysis, of the stabilized lignin from PS2 Water Separation 6, PS2 Water Separation 8, PS2 Water Separation 9, PS2 Water Separation 10, PS2 Water Separation 11, PS2 Water Separation 14, PS2 Water Separation 15, PS2 Water Separation 16, PS2 Water Separation 18, PS2 Water Separation 19, PS2 Water Separation 20 and PS2 Water Separation 21, the curves showing no glass transition temperature up to 200° C.

Figure 12:
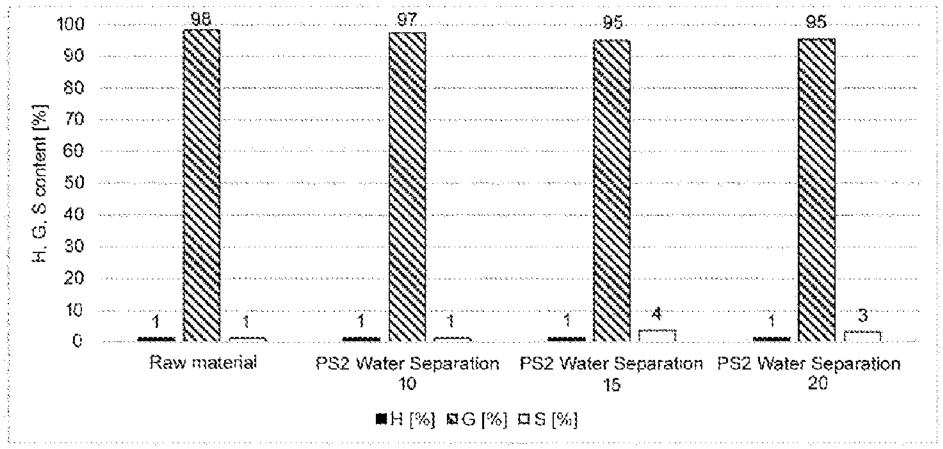

FIG. 12 shows the composition of the lignin building blocks in percentages, as determined by Py-GC/MS. The content of S building blocks in percent increases due to the stabilization of the particles in step b) after precipitation. This can be attributed to the introduction of the hydroxymethyl group as a result of the modification, and to the newly formed methylene bridges between the aromatic compounds as a consequence of the stabilization.

Figure 13:
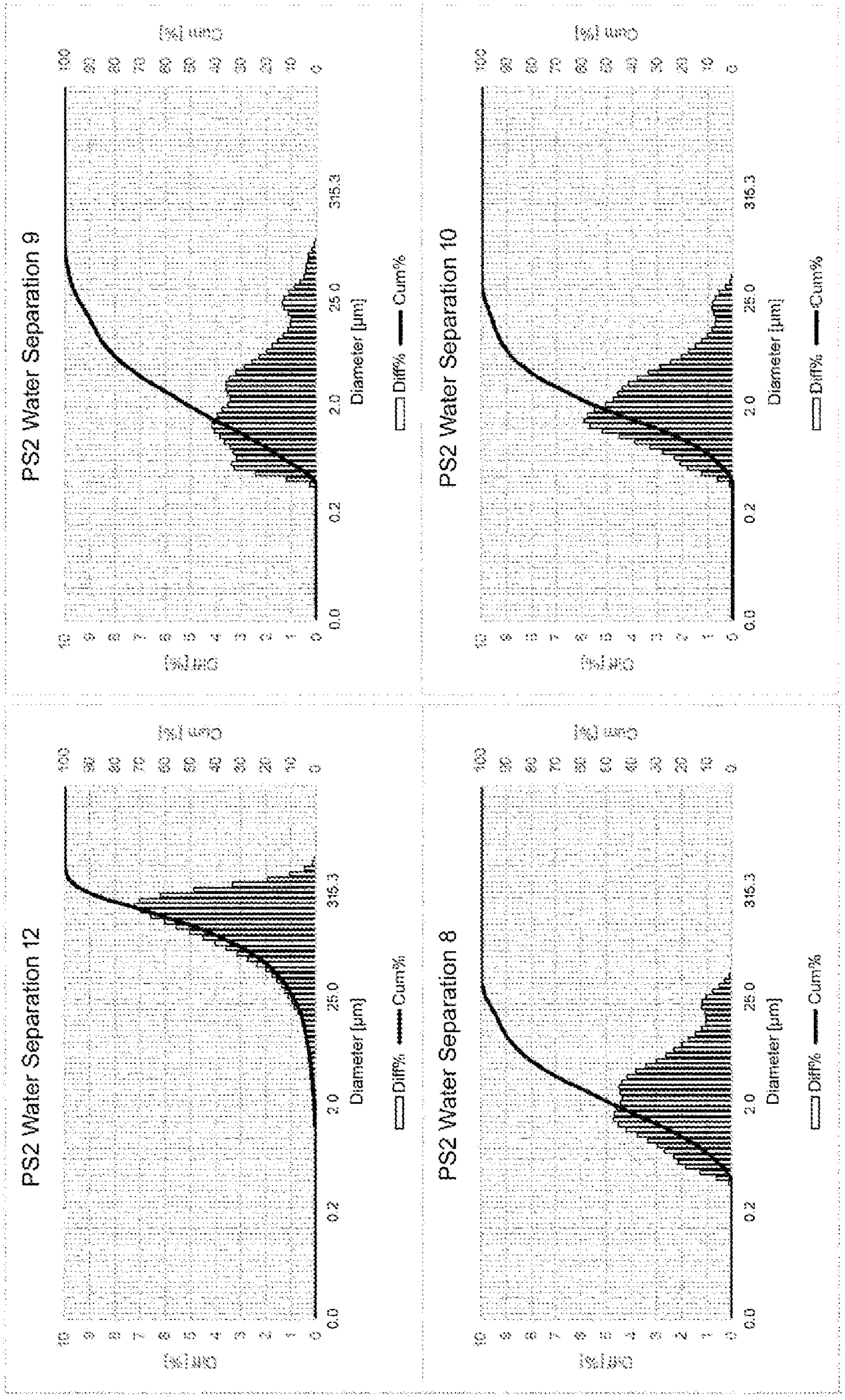
Figure 13:
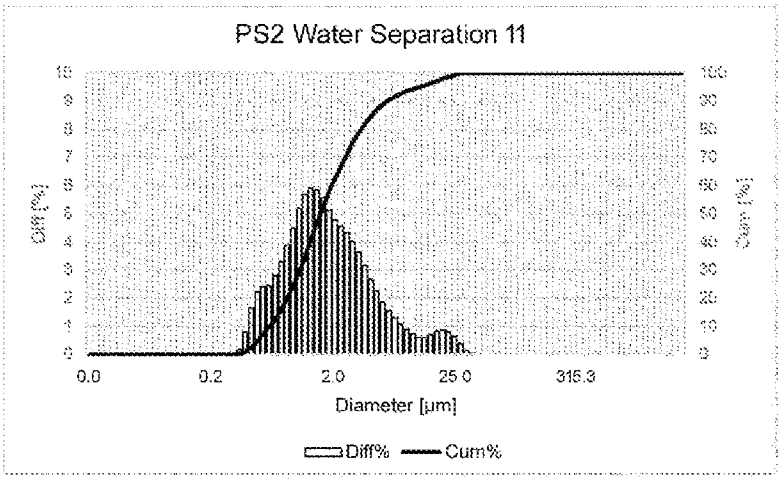

FIG. 13 shows the measurement of the particle size distribution PSD of PS2 Water Separation 8 (d50=2.1 μm), PS2 Water Separation 9 (d50=1.9 μm), PS2 Water Separation 10 (d50=1.7 μm), PS2 Water Separation 11 (d50=1.7 μm), PS2 Water Separation 12 (d50=135.2 μm).

Figure 14:
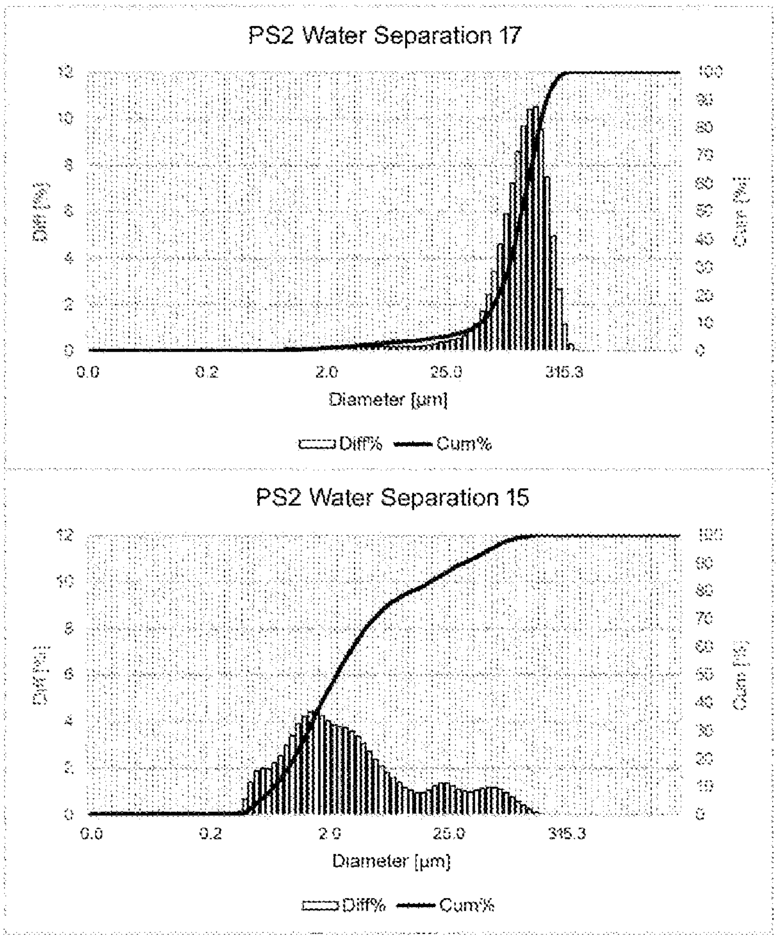

FIG. 14 shows the measurement of the particle size distribution PSD of PS2 Water Separation 17 (d50=125.2 μm) and PS2 Water Separation 15 (d50=2.4 μm).

Figure 15:
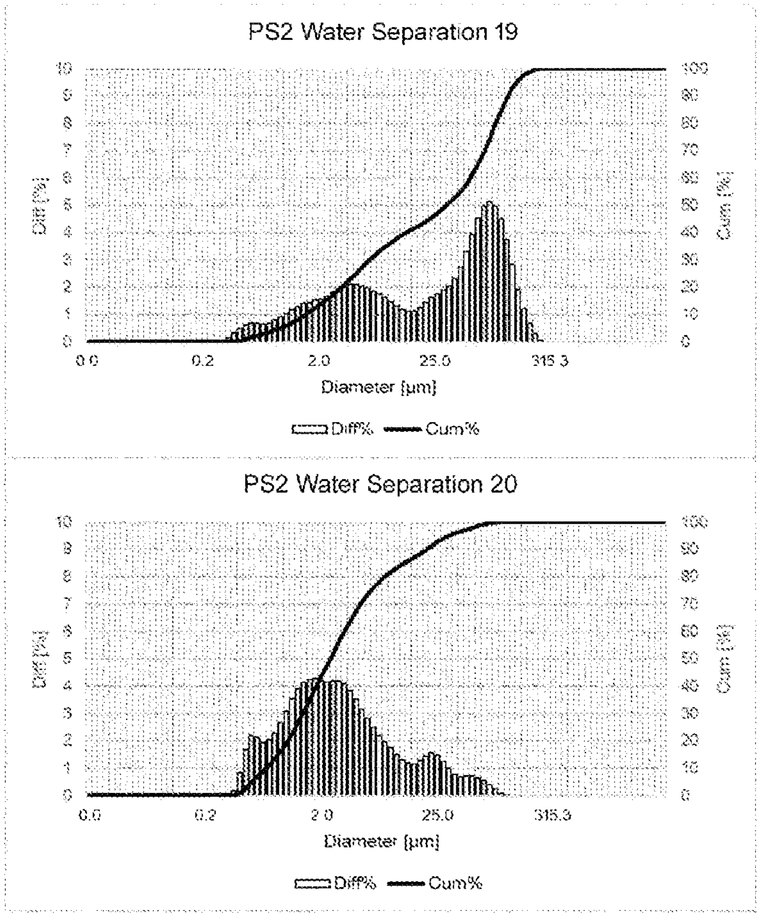

FIG. 15 shows the measurement of the particle size distribution PSD of PS2 Water Separation 19 (d50=27.1 μm) and PS2 Water Separation 20 (d50=2.4 μm).

The measurements of the particle size show that the particle size distribution (PSD) can be controlled via the temperature during stabilization. The sample PS2 Water Separation 12, without stabilization of the particles in step b) after precipitation, serves as the reference sample and exhibits a higher alkaline solubility as well as a lower surface area. By tempering the particles in step b) after precipitation, significantly finer particles with high surface areas and lower solubility are generated. In the same way, the samples PS2 Water Separation 17 and PS2 Water Separation 15 show that mild drying conditions at reduced pressure can lead to a similar result.

Also, the samples PS2 Water Separation 19 and PS2 Water Separation 20 show that by increasing the temperature during drying, in the sense of water separation, the alkaline solubility can be controlled.

Figure 16:
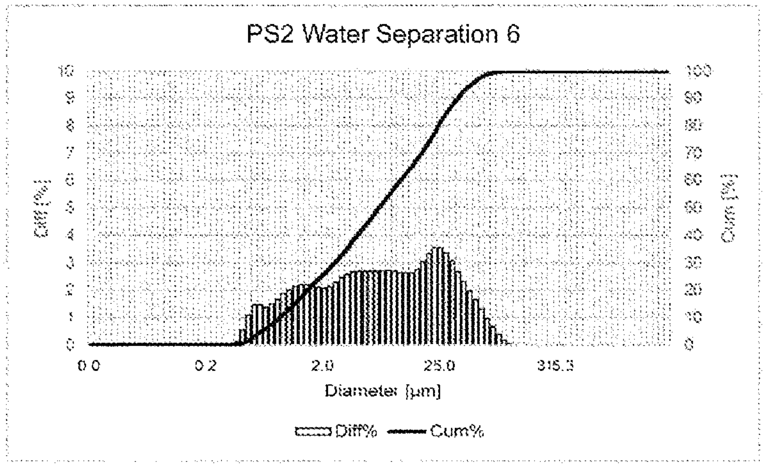

FIG. 16 shows the measurement of the particle size distribution PSD of PS2 Water Separation 6 (d50=6.5 μm).

The particle size measurement shows that an advantageous particle size distribution can be achieved even when using a higher concentrated precipitating agent. This sample is distinguished by a low alkaline and ethanol solubility.

The invention claimed is:

1. A method for producing a lignin in particulate form from a liquid containing a lignin-containing raw-material, wherein the lignin is at least in part dissolved in the liquid, wherein the process comprises the following steps:

(a) reacting lignin dissolved in the liquid with at least one cross-linking agent in the liquid at a temperature in a range from 60 to 180° C. and at a pH value of the liquid in a range from 7 to 14 in order to obtain modified lignin dissolved in the liquid, (b) precipitating the dissolved modified lignin obtained in step (a) by mixing the liquid with a precipitating agent at a temperature in a range from 0 to below 150° C. with the formation of lignin particles in the liquid, and (c) separating the liquid from the lignin particles formed in step (b), wherein in step (b) the liquid mixed with the precipitating agent is heat-treated after the precipitation at a temperature in a range from 60 to 200° C. for a period of 1 minute to 6 hours, and/or in an additional step (d) after step (c), the lignin particles separated from the liquid are heat-treated at a temperature in the range from 90 to 600° C.

2. The method according to claim 1, characterized in that wherein the liquid that contains lignin-containing raw material is selected from:

black liquor from Kraft pulping of woody biomass or solids produced therefrom that are mixed with a liquid, solids from enzymatic hydrolysis of woody biomass that are mixed with a liquid, black liquor from pulping of woody biomass with sulfites (lignosulfonates) or solids produced therefrom that are mixed with a liquid, or liquids from pulping of woody biomass with organic solvents or organic acids, or solids produced therefrom that are mixed with a liquid.

3. The method according to claim 1, wherein the liquid comprises or is selected from:

an acidic aqueous liquid or an alkaline aqueous liquid, at least one carboxylic acid, or at least one alcohol.

4. The method according to claim 1, wherein the at least one cross-linking agent is selected from the group consisting of: aldehydes, epoxides, acid anhydrides, polyisocyanates, and polyols.

5. The method according to claim 1, wherein the precipitating agent is selected from the group consisting of: at least one acid, a base, water, and a salt.

6. The method according to claim 5, wherein the precipitating agent is an aqueous acid if the liquid comprises or is an aqueous base, or water if the liquid comprises or is at least one carboxylic acid or at least one alcohol.

7. The method according to claim 1, wherein the pH value of the liquid after mixing with the precipitating agent is lower than 10.

8. The method according to claim 1, wherein in step (b) a precipitation additive is admixed in addition to the precipitating agent, and/or in step (a) the cross-linking agent is formed in situ from a precursor of the cross-linking agent that is contained in the liquid.

9. The method according to claim 1, wherein the dry matter content of the liquid in step (b) that contains the lignin-containing raw material, after mixing with the precipitating agent and optionally a precipitation additive, is at least 2% by weight, wherein the dry matter content is <26% by weight.

10. The method according to claim 1, wherein:

the reaction in step (a) is carried out at a temperature in a range from 60 to 130° C., and/or the precipitation in step (b) is carried out at a temperature in a range from 0 to below 100° C., if the heat treatment is carried out in the additional step (d), or the precipitation in step (b) is carried out at a temperature in a range from 90 to 130° C. if the heat treatment is carried out in step (b), and/or the heat treatment in step (b) is carried out at a temperature in a range from 80 to 170° C., wherein the maximum temperature is at least below 150° C. if a base, is used as the precipitating agent, and/or the heat treatment in the additional step (d) is carried out at a temperature in a range from 90 to 400° C.

11. The method according to claim 1, wherein duration of the heat treatment in the additional step (d) is in a range of 1 minute to 48 hours.

12. The method according to claim 1, wherein duration of the heat treatment after precipitation in step (b) is at least 5 or at least 10 minutes, or the duration of the heat treatment after precipitation in step (b) is in a range from 5 minutes to 5 hours.

13. The method according to claim 1, wherein the lignin particles formed in the method have a d50 value of a particle size distribution relative to a volume average, of less than 500 μm, wherein the d50 value of the particle size distribution is obtained by a grinding step that is carried out after step (c) or after step (d), and/or have a statistical thickness surface area (STSA) in a range from 10 $m^2/g$ to 180 $m^2/g$.

* * * * *